(12) United States Patent  (10) Patent No.: US 8,405,709 B2
Hirasawa et al.  (45) Date of Patent: Mar. 26, 2013

(54) IMAGE PROCESSING APPARATUS, IMAGE PROCESSING METHOD, AND PROGRAM

(75) Inventors: Yasutaka Hirasawa, Tokyo (JP); Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 480 days.

(21) Appl. No.: 12/550,144

(22) Filed: Aug. 28, 2009

(65) Prior Publication Data

US 2010/0053306 A1 Mar. 4, 2010

(30) Foreign Application Priority Data

Sep. 2, 2008 (JP) .............................. P2008-224289

(51) Int. Cl.
*H04N 13/00* (2006.01)

(52) U.S. Cl. ................. 348/43; 348/33; 348/34; 348/55

(58) Field of Classification Search .......................... None
See application file for complete search history.

(56) References Cited

U.S. PATENT DOCUMENTS

| 6,271,875 | B1* | 8/2001 | Shimizu et al. ................. 348/42 |
| 2005/0089212 | A1* | 4/2005 | Mashitani et al. ............. 382/154 |
| 2006/0192776 | A1* | 8/2006 | Nomura et al. ................. 345/419 |
| 2008/0068389 | A1* | 3/2008 | Bakalash et al. .............. 345/505 |
| 2009/0315977 | A1* | 12/2009 | Jung et al. ....................... 348/42 |

FOREIGN PATENT DOCUMENTS

| JP | 6-194602 | 7/1994 |
| JP | 8-30806 | 2/1996 |
| JP | 9-107562 | 4/1997 |
| JP | 10-51812 | 2/1998 |
| JP | 2000-209614 | 7/2000 |
| JP | 2005-151534 | 6/2005 |

* cited by examiner

*Primary Examiner* — Mohamed Ibrahim
(74) *Attorney, Agent, or Firm* — Finnegan, Henderson, Farabow, Garrett & Dunner, L.L.P.

(57) ABSTRACT

An image processing apparatus includes a determining unit, a converter, and a display unit. The determining unit receives image data for three-dimensional display as input, and determines the three-dimensional display format corresponding to the input data. The converter converts the input data in accordance with the determination results from the determining unit. The display unit displays the converted results from the converter.

9 Claims, 22 Drawing Sheets

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program therefor. More particularly, the present invention relates to an image processing apparatus, an image processing method, and a program whereby a three-dimensional display is expressed by means of either a space-division or time-division format.

In further detail, the present invention relates to an image processing apparatus, an image processing method, and a program whereby input images are determined to be data in space-division format or time-division format, and then converted into images in an output format.

2. Description of the Related Art

In motion image media such as television and movies, image data is typically displayed on a flat plane. For this reason, even if a person views the displayed images, that person does not perceive depth information related to the images. Although it has been long established that the use of the stereoscopic principle can cause a viewer to perceive depth even when displaying image data on a flat plane, broad adoption of such techniques has not occurred.

Meanwhile, 3D televisions with built-in mechanisms enabling stereoscopy are starting to be actually sold as commercial products, while three-dimensional image broadcast tests using normal broadcast networks have also begun. Furthermore, the number of movie theaters adapted to screen 3D movies is also notably increasing. Environments for viewing 3D images are rapidly becoming more available.

In stereoscopy, images captured from different perspectives are respectively presented to a person's left and right eyes. Depth is then perceived from the parallax between the left and right images, or the perception of depth is induced by convergence. As a result, a person can perceive depth, even when given image data displayed on a flat plane. Technology of the related art associated with three-dimensional image display processing is disclosed in Japanese Unexamined Patent Application Publication Nos. H9-107562, H8-30806, H10-51812, 2000-209614, 2005-151534, and H6-194602, for example.

In stereoscopy, a large number of methods for respectively presenting different images to the left and rights eyes have been proposed, and most can be mainly categorized into one of two types of methods: a method wherein the different images to be respectively presented to the left and right eyes (hereinafter, the image to be presented to only the left eye may also be referred to as the left image, while the image to be presented to only the right eye may also be referred to as the right image) are presented in alternation (i.e., a time-division format), and a method wherein a single frame is constructed from the left image and the right image and then presented (i.e., a space-division format).

When presenting images in either of the above formats, some kind of differing modulation is applied to the left and right images, such that only the left image is incident on the left eye, and only the right image is incident on the right eye. Hereinafter, examples of three-dimensional image display systems currently in practical use (or currently being developed for practical use) will be given for each of the above formats.

[1. Space-Division by Circularly-Polarized Light]

First, space-division by circularly-polarized light will be described. This method assumes a progressive display format, wherein a single frame is divided into odd fields (i.e., odd lines) and even fields (i.e., even lines), with the left image being displayed in the even fields and the right image being displayed in the odd.fields (the reverse is also possible). The light from each field is polarized differently by a polarizing filter applied to the display face. For example, by applying different circularly-polarizing filters alternating every line, the even field light can become right-polarized light, while the odd field light can become left-polarized light. By wearing glasses to which different polarizing filters have been applied on the left and right sides thereof, the viewer perceives only the left image with the left eye, and only the right image with the right eye.

Three-dimensional broadcast tests using the above display format has actually begun on satellite broadcast channels, and the commercial release of a large flat-panel display compatible with such broadcasts is also planned.

[2. Time-Division by Liquid Crystal Shutter Glasses]

Next, time-division by liquid crystal shutter glasses will be described. In a time-division format using liquid crystal shutter glasses, left images are displayed as even-numbered frames (or fields, in the case of interlaced display), in alternation with right images displayed as odd-numbered frames, for example. The viewer puts on liquid crystal shutter glasses and views the images. The liquid crystal shutter glasses are synchronized with the alternating presentation of left and right images, and alternately block incoming light at the viewer's left or right eye. This behavior causes only left images to be incident on the left eye and only right images to be incident on the right eye. Thus, by the stereoscopic principle, the viewer is able to perceive a three-dimensional image.

Formats using liquid crystal shutter glasses have been in use for a long time, and liquid crystal shutter glasses and a wide variety of products are currently being sold.

[3. Time-Division Using Polarized Light]

Next, time-division using polarized light will be described. In many cases, the liquid crystal shutter glasses used in the above time-division format 2 are expensive. Consequently, time-division is realized using polarized glasses, which are cheaper compared to liquid crystal shutter glasses.

The present format is basically a time-division format, and thus the construction of frames for display does not differ from the time-division method using liquid crystal shutter glasses. In other words, left images are displayed in even frames, and right images and displayed in odd frames, for example. The present format differs from the above time-division format 2 in that a circularly-polarizing filter is installed in front of the image display unit. The polarizing filter is made up of a liquid crystal panel, and is able to change polarization with time. Thus, by changing the polarization direction every frame, it becomes possible to convert only the left images displayed in even frames to left-polarized light, and convert only right images displayed in odd frames to right-polarized light, for example. Similarly to the space-division by circularly-polarized light in the above format 1, the viewer puts on polarized glasses with different polarizations on the left and right sides thereof. The polarized glasses cause only left images to be incident on the left eye, and only right images to be incident on the right eye, thereby enabling the viewer to perceive a three-dimensional image. A movie theater system wherein a polarizing liquid crystal panel is installed in front of a projector is currently being sold by the RealD corporation.

SUMMARY OF THE INVENTION

As described above, several technologies of the related art practically apply a method for causing a viewer to perceive depth and recognize three-dimensional images by displaying images in a space-division format or a time-division format. However, in the above plurality of three-dimensional image display systems, unique image data format are implemented in each system, and thus the image data formats (i.e., how the left and rights images are arranged in the image data) are incompatible among respective systems. Even assuming that the image data formats are convertible among respective systems, a problem occurs if image data with correctly-perceived depth when displayed in 3D using the space-division format is displayed using the time-division format. In this case, if a moving object exists in the image data, then perceived depth for the moving object becomes different from the actual depth. A similar problem occurs if image data with correctly-perceived depth when displayed in 3D using the time-division format is displayed using the space-division format, and the perceived depth of moving objects becomes different from the actual depth.

In light of the foregoing circumstances, it is desirable to provide an image processing apparatus, an image processing method, and a program operating such that, when image data in an incompatible three-dimensional image format is received as input, the format is determined and the image data is optimally converted to a suitable three-dimensional image display format, thereby enabling correct depth perception.

An image processing apparatus in accordance with a first embodiment of the present invention includes: a determining unit configured to receive image data for three-dimensional display as input, and determine the three-dimensional display format corresponding to the input data; a converter configured to convert the input data in accordance with the determination results from the determining unit; and a display unit configured to display the converted results from the converter.

In the image processing apparatus in accordance with an embodiment of the present invention, the determining unit may determine whether the input data is in time-division format or space-division format. If the input data format differs from the display format corresponding to the display unit, then the converter converts the input data from the time-division format to the space-division format, or alternatively, converts from the space-division format to the time-division format.

In the image processing apparatus in accordance with an embodiment of the present invention, the determining unit may select two successive frames from the frames constituting the input data, analyze the similarity of two successive frames, and according to the analysis results, determine whether the input data is in time-division format or space-division format.

In the image processing apparatus in accordance with an embodiment of the present invention, the determining unit may select, from the frames constituting the input data, a single base frame as well as two successive frames as reference frames. The determining unit then computes the similarity between two motion vectors V and W respectively computed from a combination of the base frame and one of the reference frames. The determining unit compares the computed similarity to a threshold value set in advance, and according to the comparison results, determines whether the input data is in time-division format or space-division format.

In the image processing apparatus in accordance with an embodiment of the present invention, if the input data is in space-division format, then the determining unit may determine whether the input data is in a side-by-side space-division format or an interlaced space-division format.

In the image processing apparatus in accordance with an embodiment of the present invention, the determining unit may select a single frame from the frames constituting the input data, analyze the similarity of the left and right images in the selected frame, and according to analysis results, determine whether the input data is in a side-by-side space-division format or an interlaced space-division format.

In the image processing apparatus in accordance with an embodiment of the present invention, the determining unit may select a single frame from the frames constituting the input data, compute the similarity of the left and right images in the selected frame by using a vector V(M) obtained by block matching of the left and right images, compare the computed similarity to a threshold value set in advance, and according to comparison results, determine whether the input data is in a side-by-side space-division format or an interlaced space-division format.

In the image processing apparatus in accordance with an embodiment of the present invention, the determining unit may select a single frame from the frames constituting the input data, generate an even field image and an odd field image from the selected frame, analyze the similarity between the even field image and odd field image thus generated, and according to the analysis results, determine whether the input data is in a side-by-side space-division format or an interlaced space-division format.

In the image processing apparatus in accordance with an embodiment of the present invention, the determining unit may select a single frame from the frames constituting the input data, generate an even field image and an odd field image from the selected frame, compute the inter-block similarity between the even field image and the odd field image thus generated, compare the computed similarity to a threshold value set in advance, and according to comparison results, determine whether the input data is in a side-by-side space-division format or an interlaced space-division format.

In the image processing apparatus in accordance with an embodiment of the present invention, the converter may be configured to convert data in space-division format to data in time-division format. In each frame of the input data, the converter separates a left image for the left eye from a right image for the right eye, converts the resolution of the left image and the right image thus separated, delays the time-direction phase of the left image or the right image by 0.5 frames, and reconstructs output data with the left images as even frames and the right images as odd frames.

In the image processing apparatus in accordance with an embodiment of the present invention, the converter may be configured to convert data in time-division format to data in space-division format. In each frame of the input data, the converter separates a left image for the left eye from a right image for the right eye, converts the resolution of the left image and the right image thus separated, advances the time-direction phase of the left image or the right image by 0.5 frames, and then reconstructs output data by generating single frames from each left and right image.

An image processing method in accordance with a second embodiment of the present invention is executed in an image processing apparatus, and includes the steps of: receiving image data for three-dimensional display as input, and determining the three-dimensional display format corresponding to the input data; converting the input data in accordance with the determination results from the determining step; and displaying the converted results from the converting step.

A program in accordance with a third embodiment of the present invention causes an image processing apparatus to execute image processing that includes the steps of: receiving image data for three-dimensional display as input, and determining the three-dimensional display format corresponding to the input data; converting the input data in accordance with the determination results from the determining step; and displaying the converted results from the converting step.

It should be appreciated that a program in accordance with an embodiment of the present invention can be provided to a general-purpose system capable of executing a variety of program code by means of a recording medium or communication medium that provides programs in a computer-readable format. By providing such a program in a computer-readable format, processing corresponding to the program is realized on a computer system.

Further features and advantages of the present invention will become apparent upon reading of the following detailed description of exemplary embodiments in conjunction with the attached drawings. In the present specification, a system refers to the logical assembly of a plurality of apparatus, and is not limited to respective apparatus being housed in a single physical unit.

According to an embodiment of the present invention, image data for three-dimensional display is input, the three-dimensional display format corresponding to the input data is determined, the input is converted according to the determination results, and the converted results are displayed on a display unit. A determining unit determines whether the input data is in time-division format or space-division format. If the format of the input data differs from the display format corresponding to the display unit, then a converter converts the input data from time-division format to space-division format, or alternatively, from space-division format to time-division format. As a result of this configuration, three-dimensional image display processing enabling correct depth expression without being dependent on the input data format is realized.

DESCRIPTION OF THE PREFERRED EMBODIMENTS

Hereinafter, an image processing apparatus, an image processing method, and a program in accordance with embodiments of the present invention will be described in detail and with reference to the accompanying drawings. The description will proceed as follows.

Figure 1:
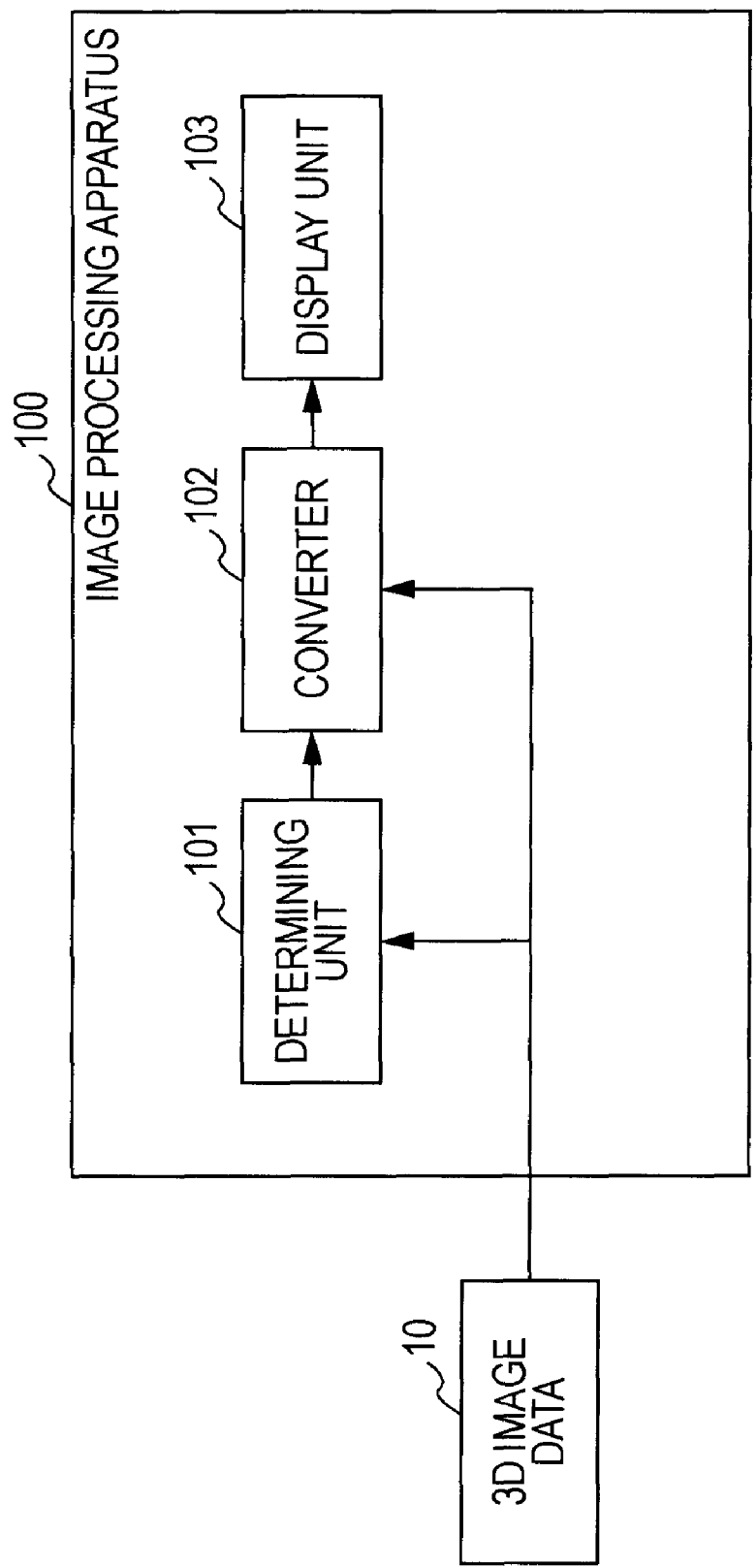
FIG. 1 is a diagram explaining an exemplary configuration of an image processing apparatus in accordance with an embodiment of the present invention.

(1) Overall configuration of image processing apparatus
(2) Details of determining unit processing
   (2-1) Summary of 3D image display formats and determining unit processing
   (2-2) Description of several 3D image display formats
      (2-2-a) Time-division format image data
      (2-2-b) Side-by-side space-division format image data
      (2-2-c) Interlaced space-division format image data
   (2-3) Details of determination processing in determining unit for each format
      (2-3-a) Method for determining time-division format image data (Method 1)
      (2-3-b) Method for determining side-by-side space-division format image data (Method 2)
      (2-3-c) Method for determining interlaced space-division format image data (Method 3)
(3) Details of converter processing
   (3-1) Exemplary process for converting space-division format input image data into time-division format data
   (3-2) Exemplary process for converting time-division format input image data into space-division format data
(4) Details of display unit processing
(1) Overall Configuration of Image Processing Apparatus FIG. 1 illustrates the basic configuration of an image processing apparatus in accordance with an embodiment of the present invention. As shown in FIG. 1, the image processing apparatus 100 in accordance with an embodiment of the present invention includes a determining unit 101, a converter 102, and a display unit 103. Although not shown in FIG. 1, the image processing apparatus 100 is also provided with an input unit that receives data input, as well as user operation information and command input from the user.

The image processing apparatus 100 receives externally-provided 3D image data 10 as input. The input data may be input from a DVD or similar medium, by broadcast, from the Internet, or from another information processing apparatus, for example. The input 3D image data 10 is formatted according to any one of various 3D image display formats. For example, 3D image data corresponding to a time-division format or a space-division format is input.

The 3D image data 10 thus input is supplied to the determining unit 101 and the converter 102. In the determining unit 101, the format of the input 3D image data 10 is determined. More specifically, it is determined whether the 3D image display format of the input 3D image data 10 is a time-division format or a space-division format.

If the input 3D image data 10 is formatted in a space-division format, then the determining unit 101 additionally determines how the image data, obtained from multiple perspectives and contained in the 3D image data 10, is spatially arranged within single frames. More specifically, the determining unit 101 determines whether the image data is in a side-by-side space-division format or an interlaced space-division format, for example. Further details regarding the above processes will be later described. The determining unit 101 supplies the data determination results to the converter 102.

The converter 102 receives as input 3D image display format information regarding the 3D image data 10, as determined by the determining unit 101. If the 3D image display format of the input 3D image data 10 differs from the display format of the display unit 103 in the image processing apparatus 100, then the converter 102 converts the input 3D image data 10 to a suitable format. By means of such data conversion, the 3D image display format of the input 3D image data 10 is converted into a 3D display image format compliant with the display format of the image processing apparatus 100, thereby correcting the depth to be perceived by the viewer. The converted results are supplied to the display unit 103.

More specifically, the converter 102 executes data conversion processing such as (a) conversion of 3D image data in time-division format to 3D image data in space-division format, and (b) conversion of 3D image data in space-division format to 3D image data in time-division format, for example.

The display unit 103 displays 3D images using either a time-division format or a space-division format. Typically, the display unit 103 is able to display 3D images using only one of either a time-division format or space-division format, and is typically not designed to display 3D images in a plurality of formats.

The converter 102 converts input image data into 3D image data corresponding to a format that can be displayed by the display unit 103. As a result of such conversion, it becomes possible to display the input data as 3D image data in a format displayable by the display unit 103, regardless of whether the input data is 3D image data in a time-division format or a space-division format.

The respective components constituting an image processing apparatus 100 in accordance with an embodiment of the present invention will now be described in detail.

(2) Details of Determining Unit Processing

The processing of the determining unit 101 will now be described in detail. The description will proceed as follows.

(2-1) Summary of 3D image display formats and determining unit processing (2-2) Description of several 3D image display formats (2-3) Details of determination processing in determining unit for each format (2-1) Summary of 3D image display formats and determining unit processing First, the 3D image display formats and determining unit processing will be summarized. The determining unit 101 determines whether the input 3D image data 10 is formatted in a time-division format or a space-division format. In addition, if the 3D image data 10 is in a space-division format, then the determining unit 101 also determines how the image data, obtained from multiple perspectives and contained in the 3D image data 10, is spatially arranged within single frames.

The determining unit 101 may, for example, determine the following three types of 3D image display formats.

a. Time-division format
b. Side-by-side space-division format
c. Interlaced space-division format The image data formats corresponding to the above three types of 3D image display formats will now be described. First, image data for typical stereoscopic 3D viewing (i.e., exemplary left and right images) will be described with reference to FIGS. 2 and 3.

Figure 2:
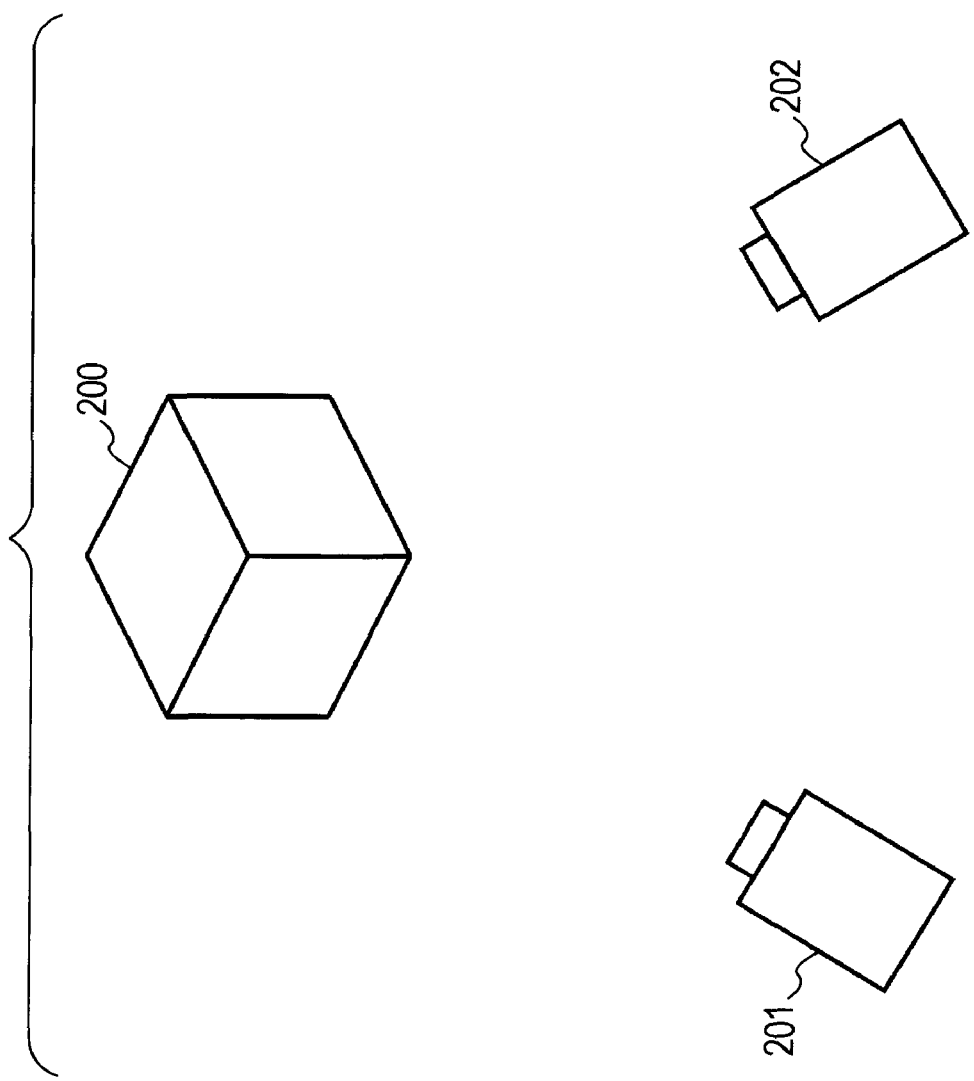
FIG. 2 is a diagram explaining exemplary left and right images constituting image data for typical stereoscopic viewing.
Figure 3:
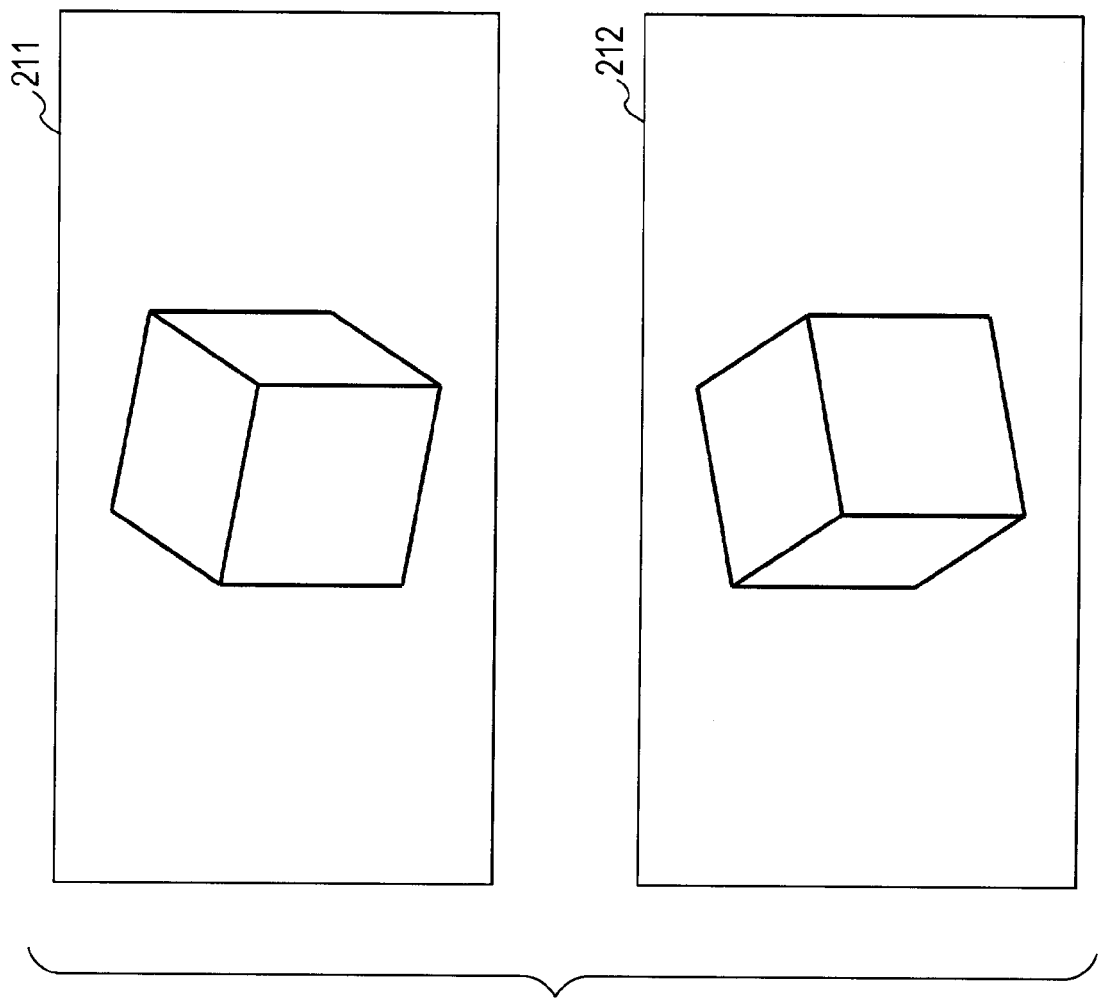
FIG. 3 illustrates exemplary images obtained from the individual cameras 201 and 202 in FIG. 2.

FIG. 2 illustrates how a cube 200 (the subject) is captured using a camera 201 and a camera 202 arranged at positions having two different perspectives. FIG. 3 illustrates exemplary images respectively obtained by the cameras 201 and 202 in FIG. 2.

The image (or frame) 211 is an image (frame) captured by the camera 201 on the left side of FIG. 2, while the image (frame) 212 is an image captured by the camera 202 on the right side. Typically, images acquired by the camera positioned on the left side are referred to as left images, while images acquired by the camera positioned on the right side are referred to as right images.

In the example shown in FIG. 3, the frame 211 is a left image, while the frame 212 is a right image. By viewing the left image frame 211 with only the left eye and the right image frame 212 with only the right eye, it is possible to perceive the cube 200 in three dimensions. If each camera captures motion images, then a series of plural left images and right images is obtained. 3D image data supplied to a typical 3D image display apparatus is made up such a series of left and right images, so as to be applicable to the 3D display method of the 3D image display apparatus. Hereinafter, image data formats corresponding to the three types of 3D image display formats described earlier will be described.

Figure 4:
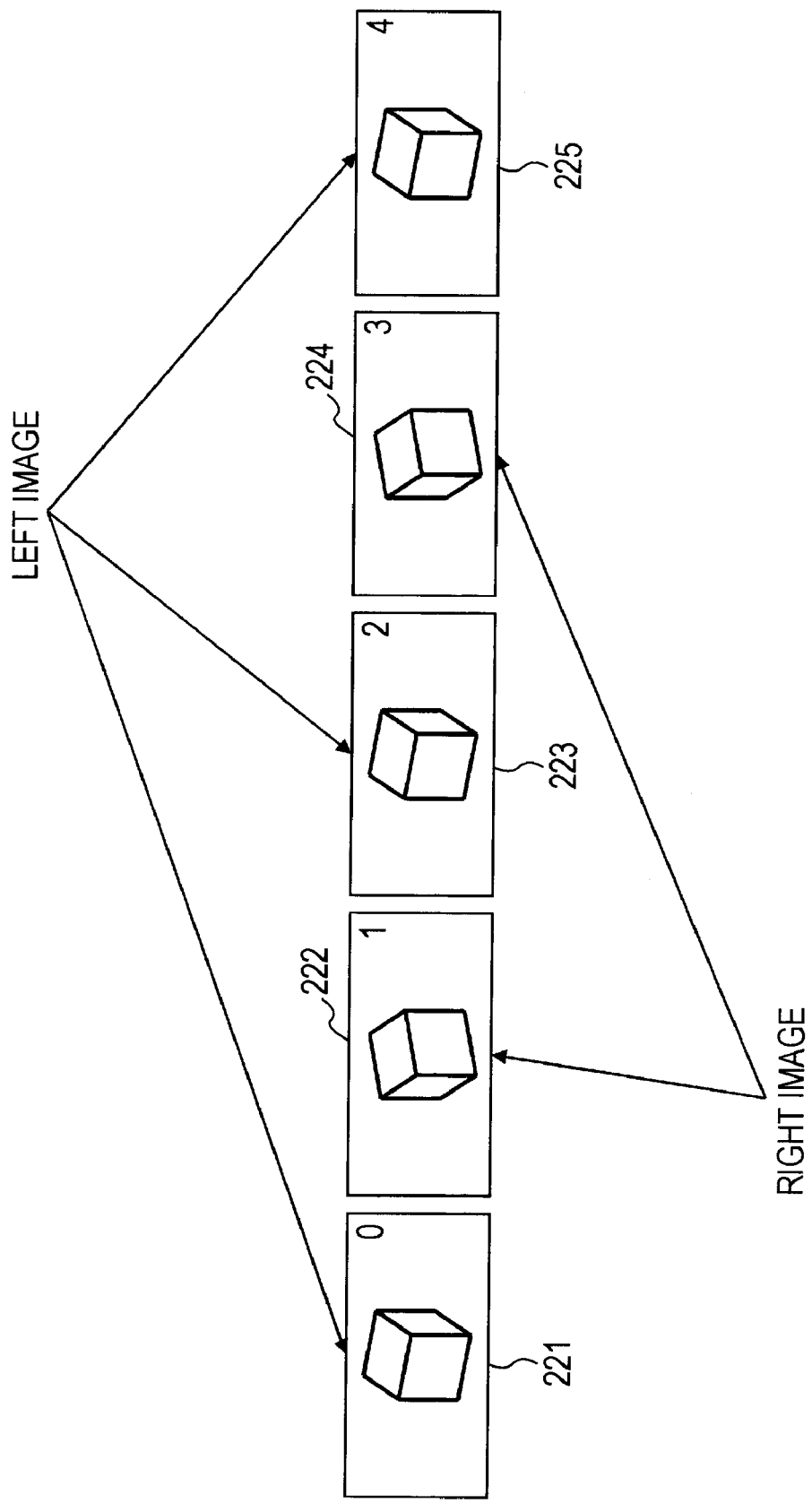
FIG. 4 illustrates a typical structure of 3D image data according to the time-division format.

(2-2) Description of Several 3D Image Display Formats (2-2-a) Time-Division Format Image Data A typical structure for 3D image data in a time-division format is illustrated in FIG. 4. In the time-division format, images obtained from the left-side perspective (i.e., left images) are displayed in single frames alternating with images obtained from the right-side perspective (i.e., right images). Consequently, in the frames constituting the image data, the left images are arranged as the even-numbered frames, while the right images as arranged as the odd-numbered frames. Alternatively, the right images are arranged as the even-numbered frames, while the left images are arranged as the odd-numbered frames.

FIG. 4 illustrates an example wherein the left images are arranged as the even-numbered frames while the right images are arranged as the odd-numbered frames. Frame 0, 221, Frame 2, 223, and Frame 4, 225 are left images, while Frame 1, 222 and Frame 3, 224 are right images. By playing back image data structured in this way, the left and right images can be alternately displayed in a timewise manner. By using liquid crystal shutter glasses worn by the viewer to appropriately block the left and right sides of the glasses in alternation, the viewer is made to perceive the left images with only the left eye, and the right images with only the right eye.

(2-2-b) Side-by-Side Space-Division Format Image Data

Figure 5:
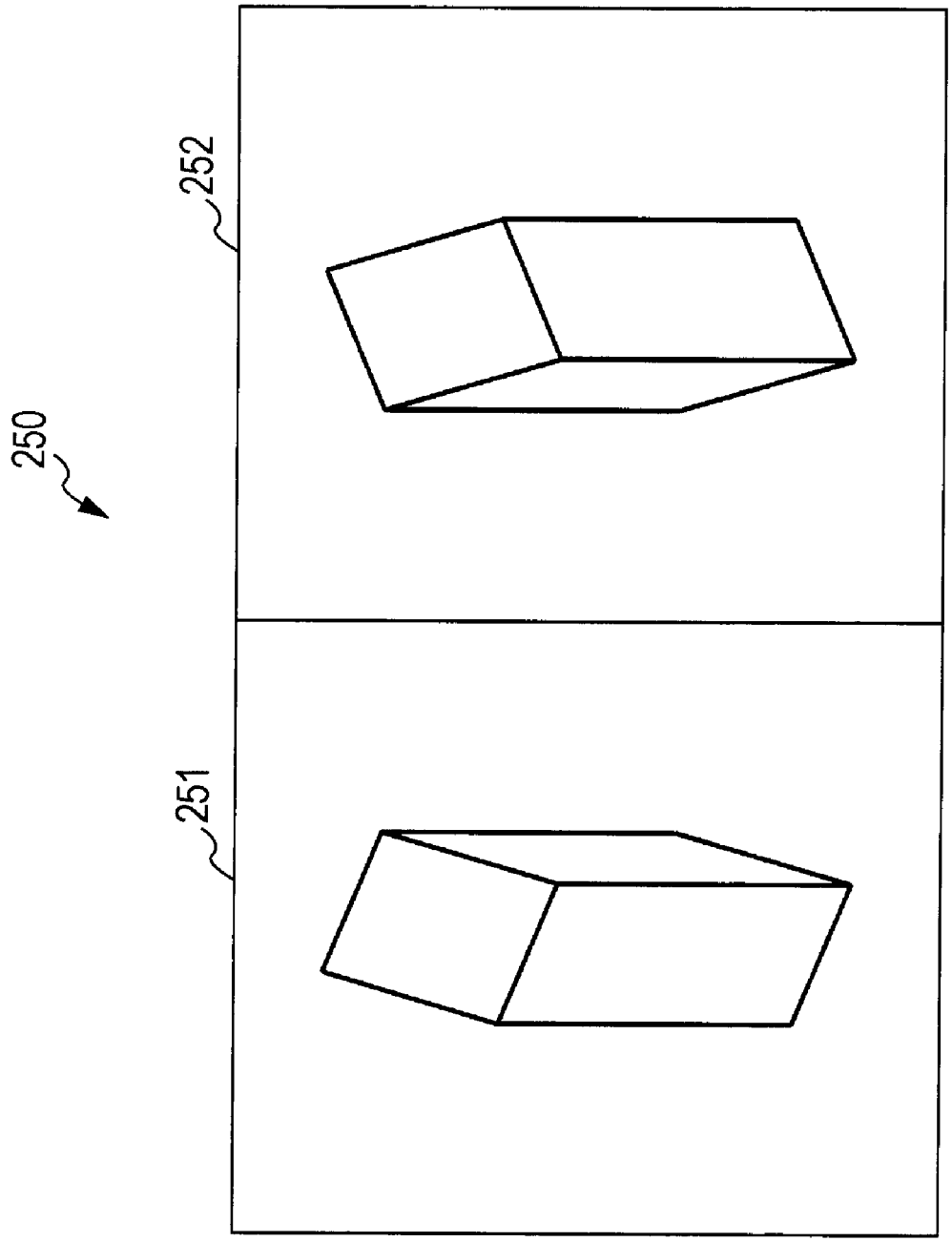
FIG. 5 is a diagram for explaining a typical structure of 3D image data according to the side-by-side space-division format.

A typical structure for 3D image data in a side-by-side space-division format is illustrated in FIG. 5. In the space-division format, the left and right images are contained within the individual frames constituting the image data. More particularly, in side-by-side space-division format image data, the left and right images are arranged in the left and right halves of each frame, respectively. The frame 250 in FIG. 5 is a frame contained within 3D image data in the side-by-side space-division format. The left image 251 on the left half of the frame 250 is made up of a left image for the left eye, while the right image 252 on the right half is made up of a right image for the right eye.

In the example shown in FIG. 5, the resolution of the single frame 250 in the 3D image data is the same as that of the left and right images. Thus, in order to fit two frames' worth of images (i.e., a left image and a right image) into a single frame, the horizontal resolution is halved for both the left image and the right image.

Currently, the 3D broadcasts being tested on satellite broadcast channels air image data in the above format. A receiving device compatible with the input of image data in such a format converts and displays the input image data in a format similar to that described in the next and final subsection 2-2-c.

(2-2-c) Interlaced Space-Division Format Image Data

Figure 6:
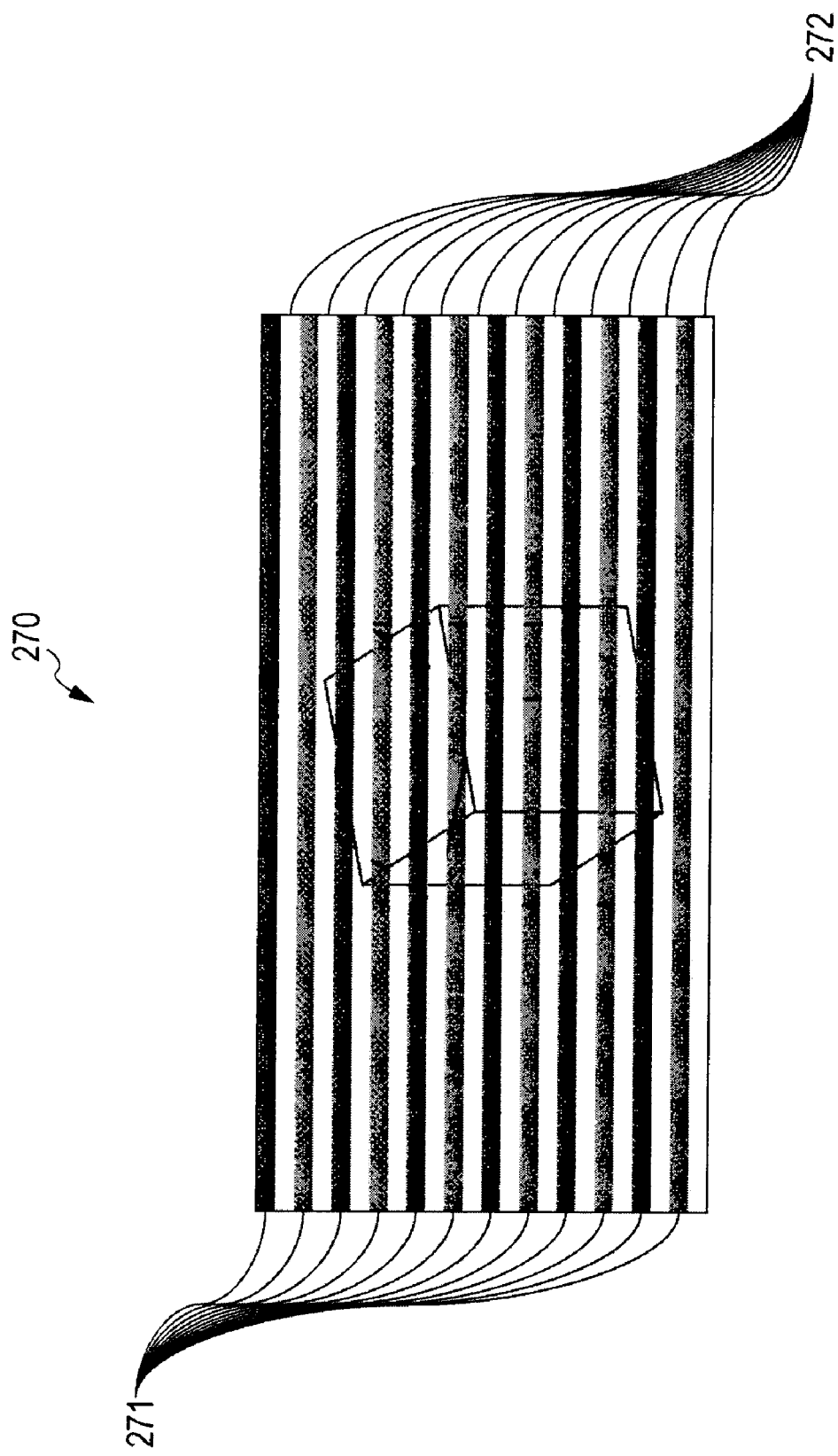
FIG. 6 is a diagram for explaining a typical structure of 3D image data according to the interlaced space-division format.

A typical structure for image data in an interlaced space-division format is illustrated in FIG. 6. In the space-division format, the left and right images are contained within the individual frames constituting the image data. More particularly, in interlaced space-division format image data, the left image is arranged on the even lines (i.e., the even field) of a frame, while the right image is arranged on the odd lines (i.e., the odd field) of a frame. Alternatively, the right image is arranged on the even lines (i.e., the even field) of a frame, while the left image is arranged on the odd lines (i.e., the odd field) of a frame.

The frame 270 shown in FIG. 6 is a single frame contained within 3D image data in the interlaced space-division format. The even lines 271 of the frame 270 are made up of a left image for the left eye. The odd lines 272 are made up of a right image for the right eye.

In the example shown in FIG. 6, the resolution of the single frame 250 in the 3D image data is the same as that of the left and right images. Thus, in order to fit two frames' worth of images (i.e., a left image and a right image) into a single frame, the vertical resolution is halved for both the left image and the right image. By playing back image data made up of frames structured in this way, both the left image and the right image can be displayed simultaneously using a single frame. For example, when displaying the image data, light from the even lines may be left-handed circularly-polarized, while light from the odd lines may be right-handed circularly-polarized. If the viewer then wears polarizing glasses applied with a polarizing filter that blocks right-handed circularly-polarized light on the left side and left-handed circularly-polarized light on the right side, the viewer perceives only left images with the left eye, and only right images with the right eye.

(2-3) Details of Determination Processing in Determining Unit for Each Format

The determining unit 101 in the image processing apparatus 100 shown in FIG. 1 determines, for example, the three types of 3D image display formats described with reference to FIGS. 4 to 6. In other words, the determining unit 101 determines whether the input image data 10 is in a. time-division format, b. side-by-side space-division format, or c. interlaced space-division format.

Hereinafter, specific examples of the determination processing executed in the determining unit 101 will be described.

(2-3-a) Method for Determining Time-Division Format Image Data (Method 1)

First, as one example of the data determination processing executed by the determining unit 101, a method for determining whether or not input image data 10 is time-division format image data (Method 1) will be described.

Figure 7:
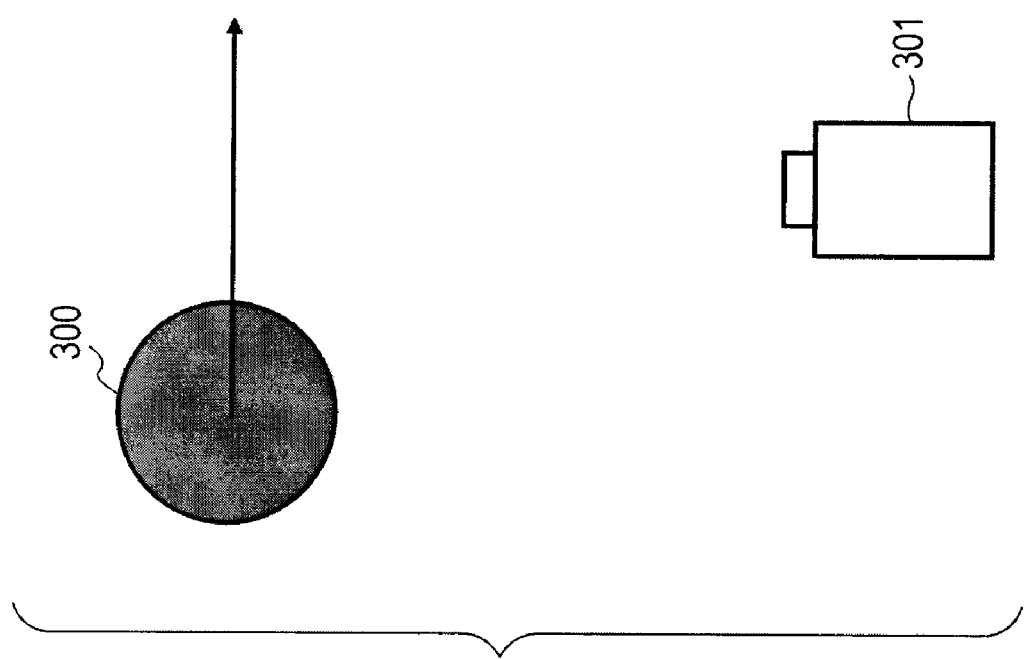
FIG. 7 illustrates the view as seen from above when capturing a sphere 300 moving towards the right by means of a camera 301.

It can be determined that the 3D image display format for a set of image data is time-division format by observing the change in the amount of motion between frames constituting the image data. First, consider a moving subject in normal image data that does not express a 3D image. FIG. 7 illustrates the view as seen from above when capturing a sphere 300 moving towards the right by means of a camera 301.

Figure 8:
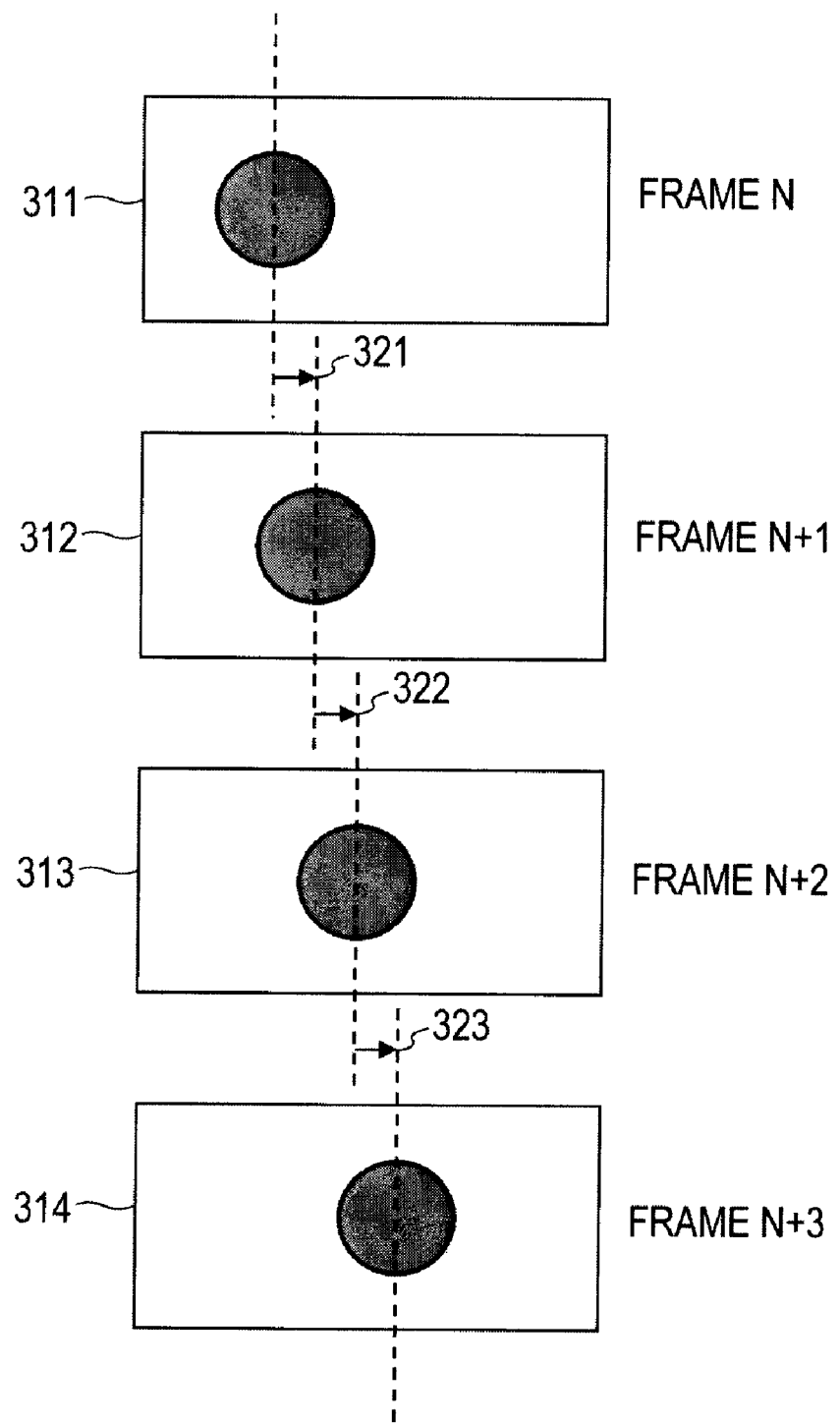
FIG. 8 is a diagram for explaining exemplary images captured by a camera under conditions like those shown in FIG. 7.

When capturing images under conditions like those shown in FIG. 7, an image sequence like that shown by way of example in FIG. 8 is obtained from the camera. Taking the frame 311 in FIG. 8 to be the Nth frame, the frame 312 becomes the (N+1) frame, the frame 313 becomes the (N+2) frame, and the frame 314 becomes the (N+3) frame. In each frame, the sphere is shown to be moving horizontally.

Consider the motion of the sphere in each frame at this point. The arrows 321 to 323 shown in FIG. 8 indicate the motion of the center portion of the sphere between frames. The arrow 321 indicates the motion between frames 311 and 312, the arrow 322 indicates the motion between frames 312 and 313, and the arrow 323 indicates the motion between frames 313 and 314. If the motion of the sphere is assumed to uniform, then the magnitude is identical for all arrows. In actual motion images, it is reasonable to assume that the motion of a subject over short times is nearly uniform, and thus it can be assumed that the amount of inter-frame motion for an acquired subject does not vary greatly.

Figure 9:
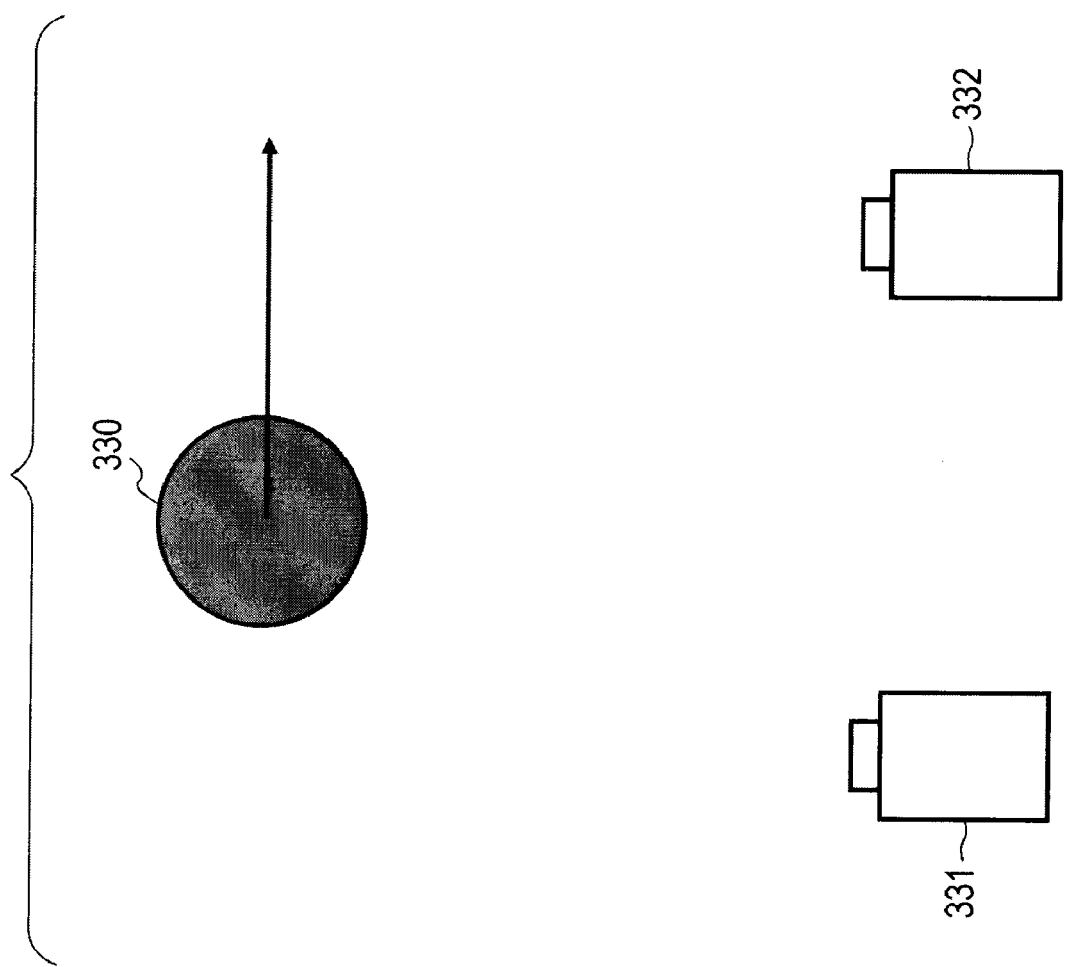
FIG. 9 illustrates the view as seen from above when capturing a sphere 330 moving towards the right by means of two cameras 331 and 332 having different perspectives.
Figure 19:
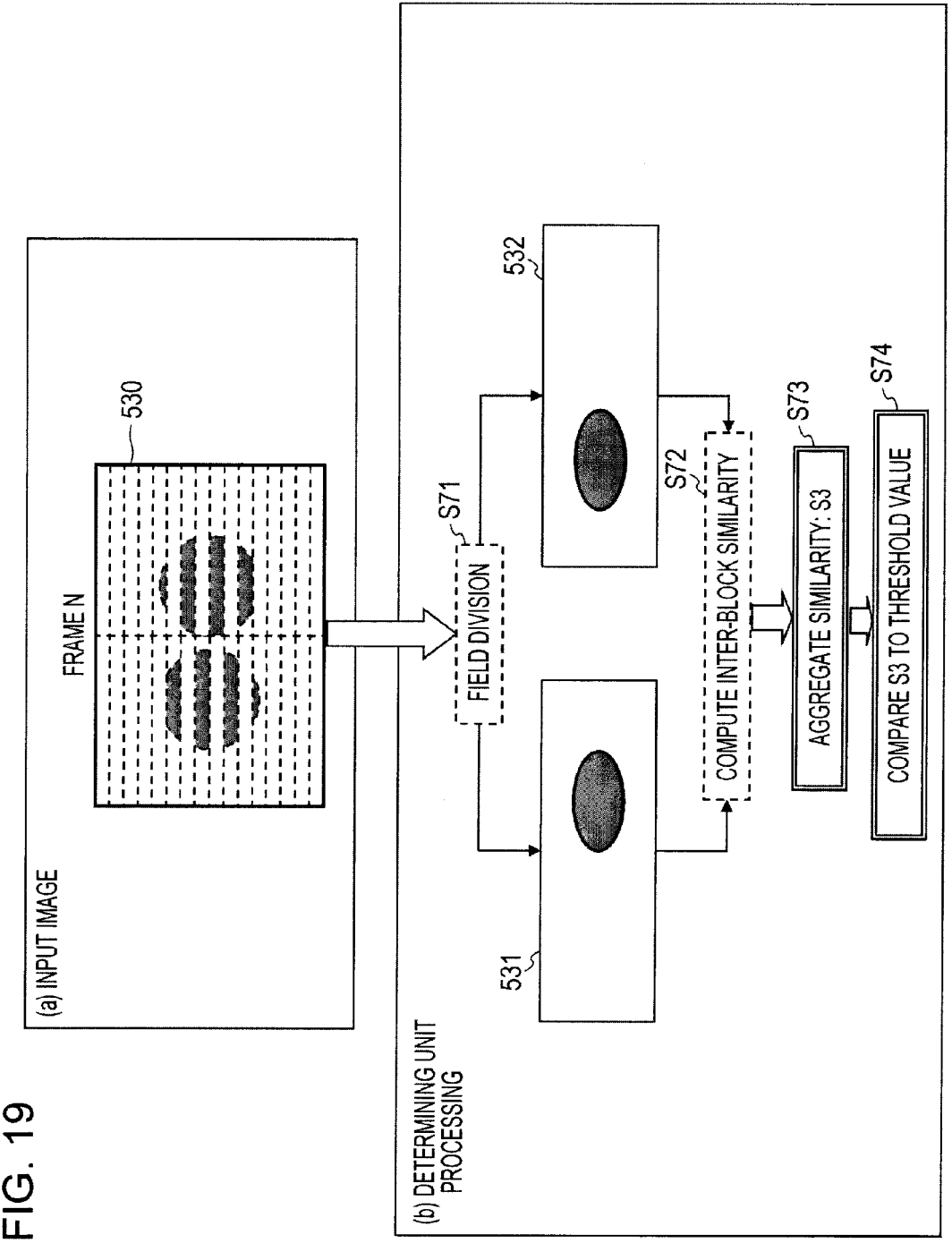
FIG. 19 is a diagram for explaining a process for determining whether or not input image data is in interlaced space-division format.

Now consider a moving subject in time-division format 3D image data. FIG. 9 illustrates the view as seen from above when capturing a sphere 330 moving towards the right by means of two cameras 331 and 332 having different perspectives. When capturing images under conditions like those shown in FIG. 9, an image group like that shown by way of example in FIG. 19 is obtained from the two cameras 331 and 332.

Figure 10:
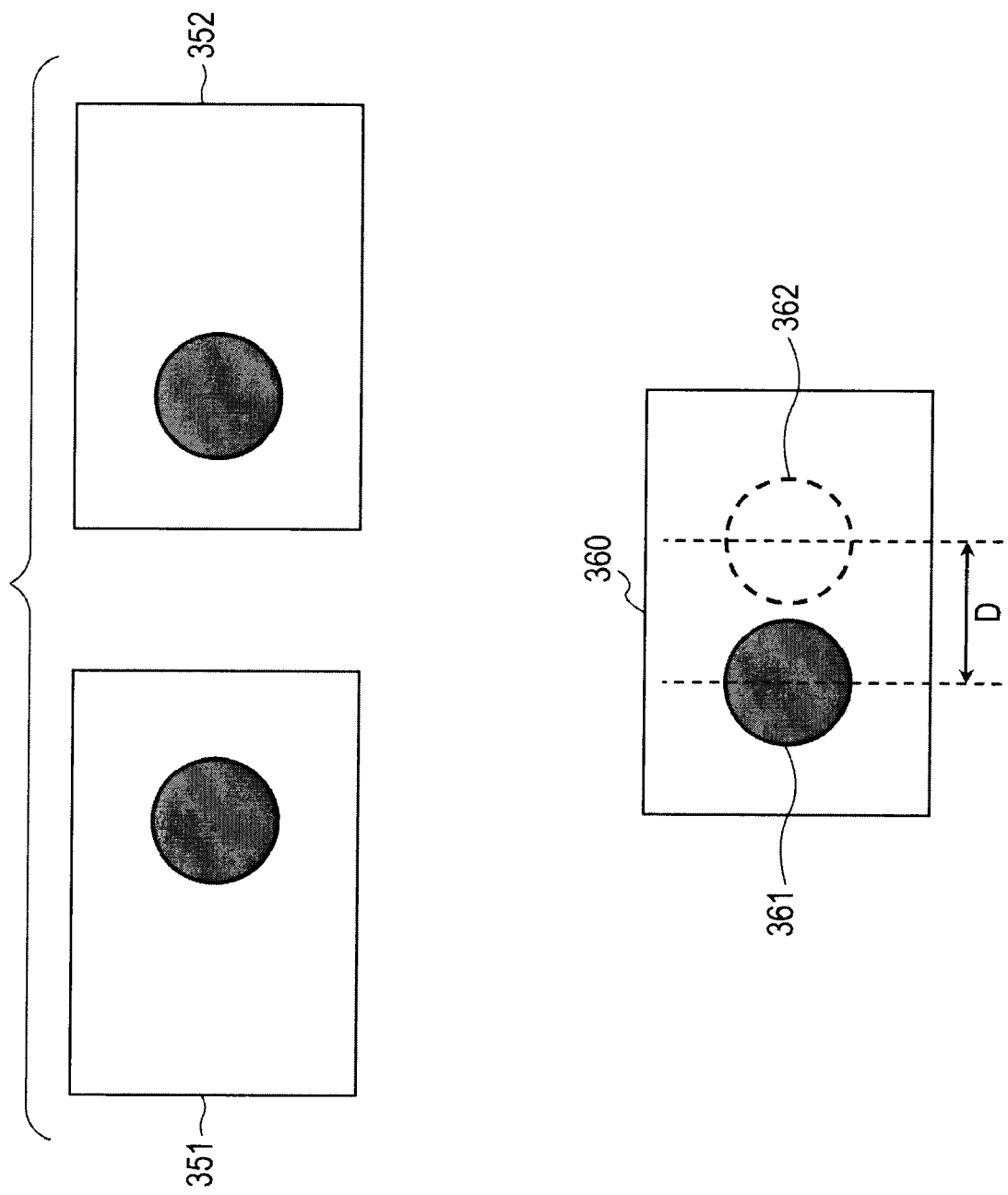
FIG. 10 is a diagram for explaining exemplary images captured by the two cameras 331 and 332 under conditions like those shown in FIG. 9.

In FIG. 10, the image frame 351 is the frame captured by the left camera 331, and is an image usable as the left image for the left eye. The image frame 352 is the frame captured by the right camera 332, and is an image usable as the right image for the right eye.

The image frame 360 is a superposition of the left image frame 351 and the right image frame 352, wherein the sphere 361 is the sphere appearing in the right image 352, and the sphere 362 is the sphere appearing in the left images 351. Herein, the sphere 362 is shown using a broken line in order to distinguish it from the sphere 361.

At this point, the distance D between the centers of the spheres in the left and right images on the image 360 will be referred to as the parallax. The parallax changes depending on the depth of the spheres when captured. Herein, if both the velocity and depth of the subjects is assumed to be constant, then the positions of the spheres in each frame can be expressed as in FIG. 11.

Figure 11:
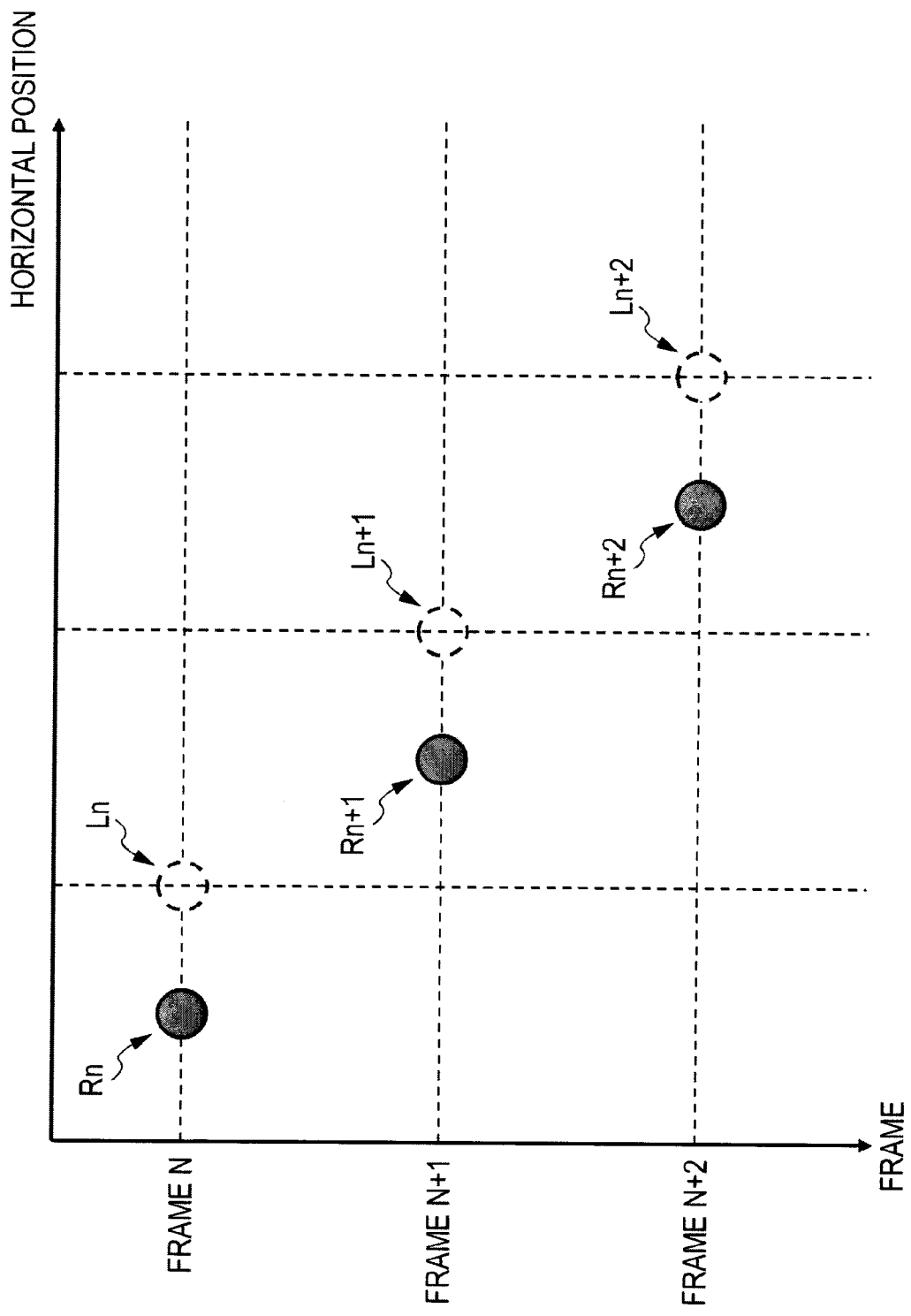
FIG. 11 is a diagram for explaining object motion and observation data in left and right images obtained by the two cameras 331 and 332 in FIG. 9.

In FIG. 11, the horizontal axis represents horizontal position in an image, while the vertical axis represents time. The broken circles L indicate the positions of the sphere in the left images obtained when capturing images in a capture environment like that shown in FIG. 9, while the solid circles R indicate the positions of the sphere in the right images similarly obtained. Since the velocity of the sphere is assumed to be constant, the change in the horizontal position over time becomes constant throughout. In addition, since the depth is assumed to be constant, the error in the horizontal position of the sphere in the left and right images (i.e., the parallax) also becomes constant throughout.

Since the left and right images are contained in the time-division format image data in an alternating manner, the information related to the position of the sphere in the left and right images during the same time periods as shown in FIG. 11 is not actually obtained. Rather, the information related to the position of the sphere that is obtained from the time-division format image data is like that shown in FIG. 12.

Figure 12:
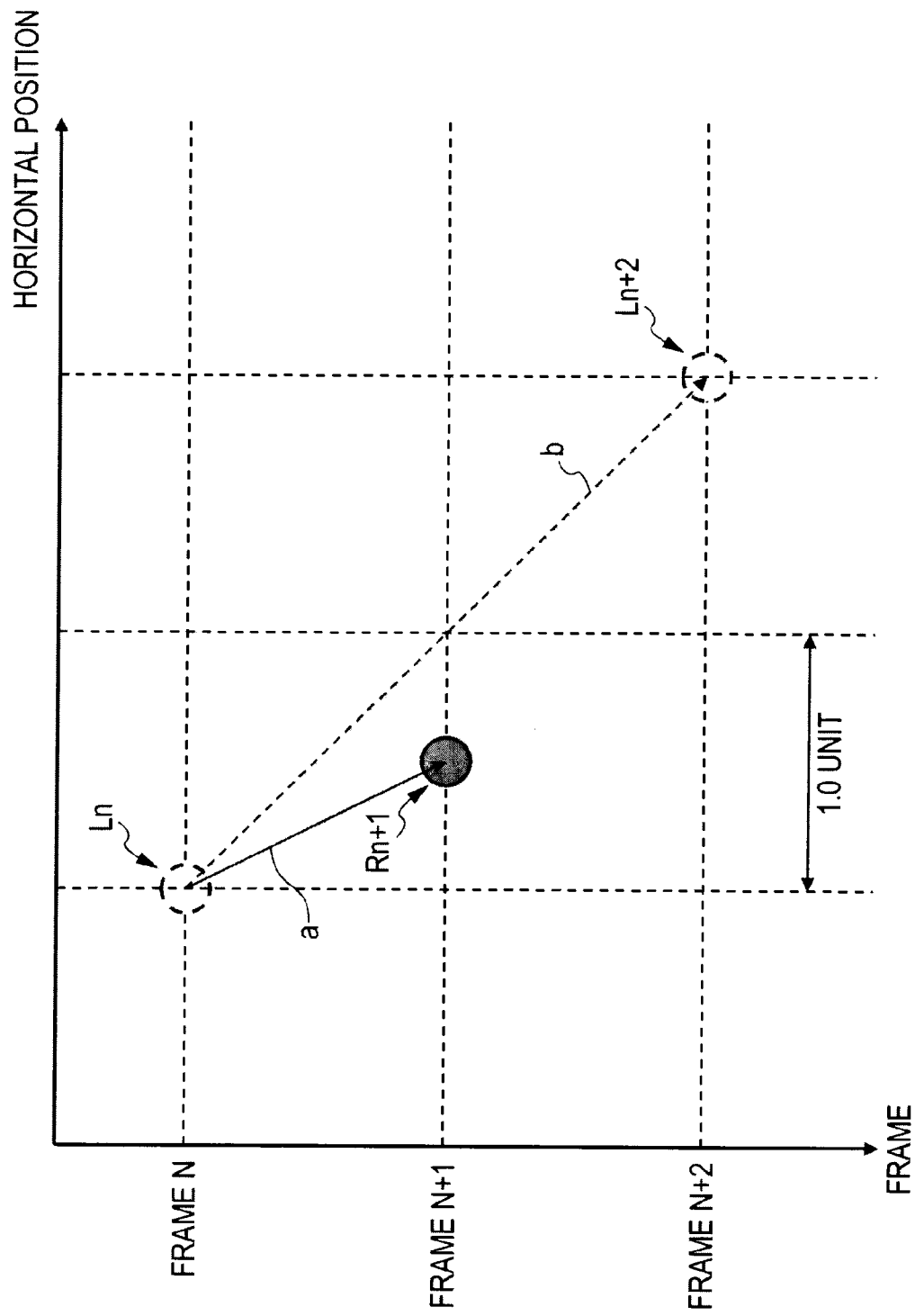
FIG. 12 is a diagram for explaining object motion and observation data in left and right images obtained by the two cameras 331 and 332 in FIG. 9.

In FIG. 12, the solid arrow a indicates the change in the horizontal position of the sphere from the frame N to the frame N+1. In addition, the broken arrow b indicates the change in the horizontal position of the sphere from the frame N to the frame N+2. The arrows demonstrate that while the change in the horizontal position of the sphere from the frame N to the frame N+1 is 0.5 units per frame, the change in the horizontal position of the sphere from the frame N to the frame N+2 is 1.0 unit per frame.

In other words, even though the object is actually moving at a constant velocity, the amount of inter-frame motion by the object is not constant in the sequence of alternating images from different perspectives.

Figure 13:
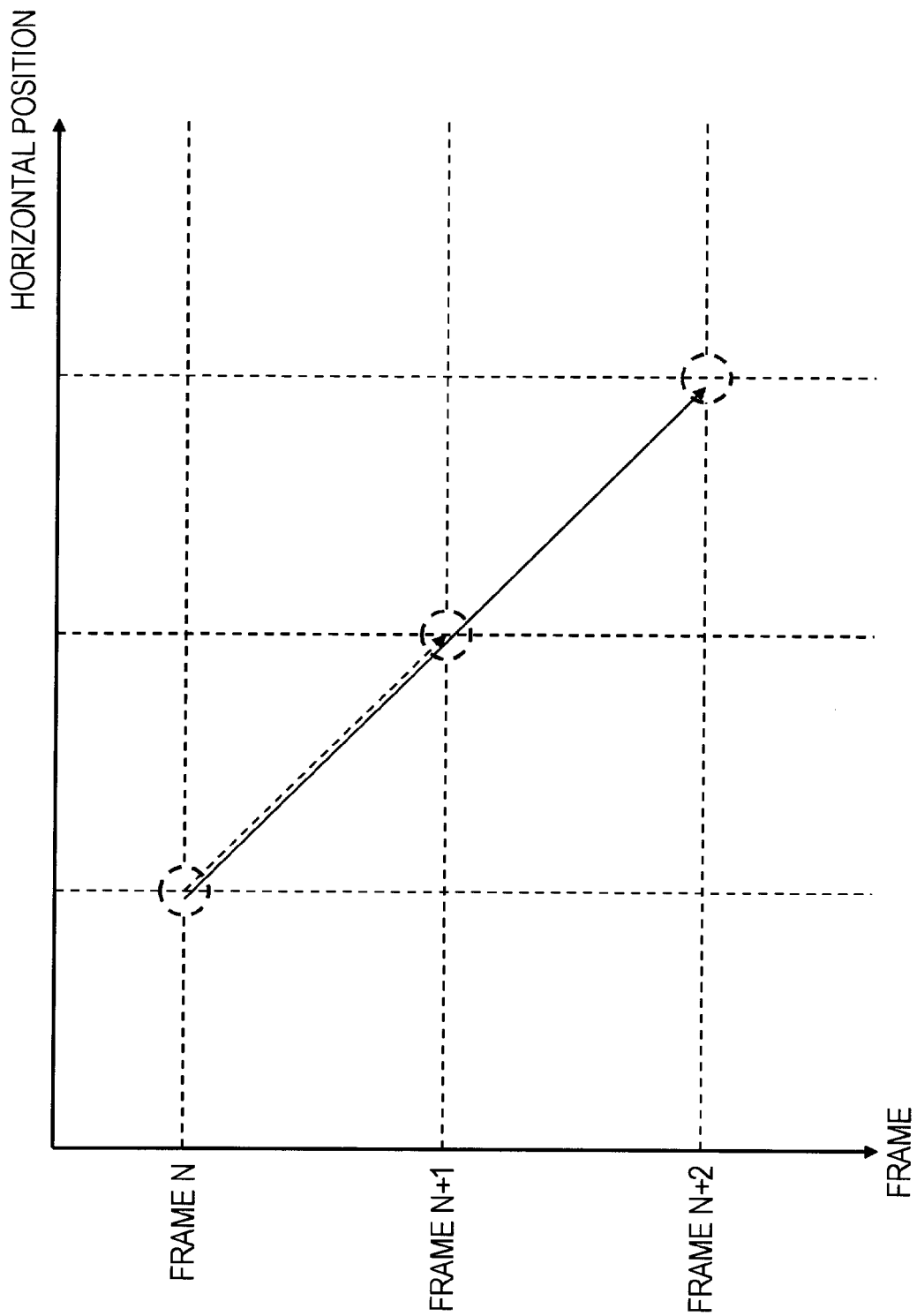
FIG. 13 is a diagram for explaining how the amount of motion of an object between frames is constant in a series of images having identical perspective.

In contrast, the amount of inter-frame motion by the object is constant in the sequence of images shown from the same perspective, as shown in FIG. 13. Although image data in space-division format contains images from plural perspectives, the images with different perspectives are contained within single frames. Since the perspective does not appear to change every frame as with image data in time-division format, the amount of motion detected between frames does not vary greatly.

Utilizing the above characteristics, the determining unit 101 determines whether or not the input 3D image data 10 is in time-division format. A specific example of determination processing in accordance with this technique will now be described with reference to FIG. 14.

Figure 14:
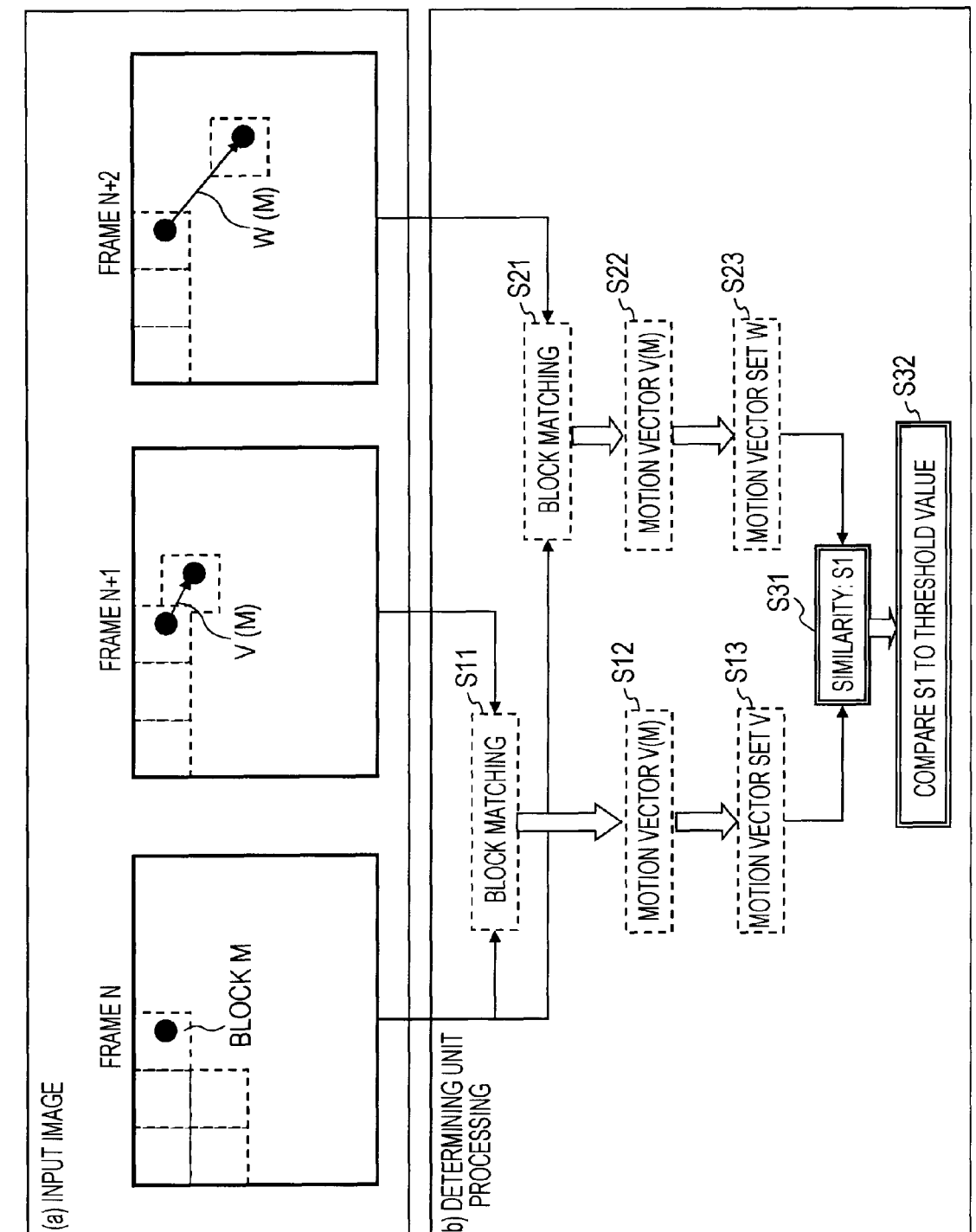
FIG. 14 is a diagram for explaining a process for determining whether or not input 3D image data is in time-division format.

The upper part of FIG. 14 illustrates the input image data 10, while the lower part of FIG. 14 illustrates the processing executed by the determining unit 101.

The determining unit 101 first divides a single frame N constituting part of the input image data 10 into blocks of arbitrary size. Next, in step S11, in order to compute a motion vector for each block, the determining unit 101 executes block matching using the frame N+1 as a reference frame. In step S12, the motion vector for a given block is solved for by block matching. The motion vector corresponding to the Mth block is designated V(M). Herein, a motion vector is a vector expressing the amount by which a block moves per frame. In the frame N+1 shown in FIG. 14, an exemplary motion V(M) for a block M is shown. In step S13, the set V of motion vectors for a plurality of blocks is solved for.

In steps S21 and S22, motion vectors are similarly detected for respective blocks using the frame N+2 as a reference frame. The motion vector corresponding to the Mth block is designated W(M). Next, in step S23, the set W of motion vectors for a plurality of blocks is solved for. In step S31, the similarity S1 between V and W is computed according to the following equation.

$$S1 = -\sum_{M} |V_x(M) - W_x(M)| + |V_y(M) - W_y(M)| \quad \text{(Eq. 1)}$$

In Eq. 1, $V_x(M)$ expresses the horizontal component of V(M), $V_y(M)$ expresses the vertical component of V(M), $W_x(M)$ expresses the horizontal component of W(M), and $W_y(M)$ expresses the vertical component of W(M). It should be appreciated that method for calculating the similarity S1 is not limited to the above, and that it is possible to use an arbitrary formula, such as the sum of the squares of the vector error, for example. The two motion vectors V and W can be considered to be similar with increasing values of the similarity S1.

In step S32, a threshold value T5, for example, is set in advance, and then compared to the similarity S1 between the two motion vectors V and W that were computed with respect to a single base frame using two successive frames as reference frames according to the above Eq. 1.

If (S1<T5) holds true, then the input image data is determined to be in time-division format. If (S1<T5) does not hold true, then the input image data is determined to not be in time-division format.

In the foregoing description, the three frames from the frame N to the frame N+2 are used. However, it should be appreciated that the number of frames in the frame group to be used may be increased, and the reliability of the determination results can be increased by computing a plurality of similarity values. Furthermore, the above may be conducted without detecting motion vectors for all blocks.

(2-3-b) Method for Determining Side-by-Side Space-Division Format Image Data (Method 2)

As another example of the data determination processing executed by the determining unit 101, a method for determining whether or not input image data 10 is in side-by-side space-division format (Method 2) will be described.

Figure 15:
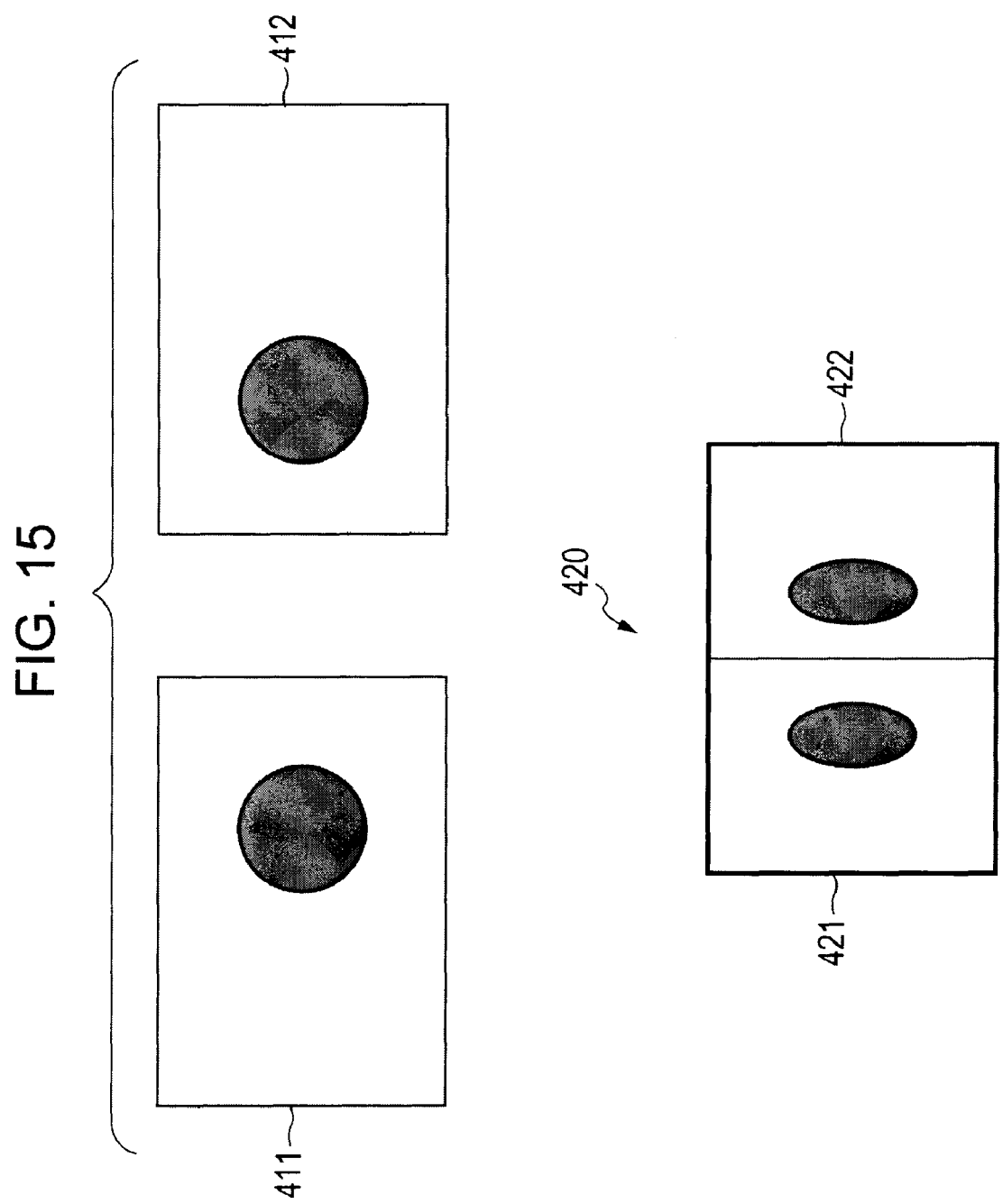
FIG. 15 is a diagram for explaining exemplary image data in side-by-side space-division format.

In side-by-side space-division format image data, the left images are arranged on the left halves of single frames, while the right images are arranged on the right halves. For example, consider the frame 411 in FIG. 15 to be a left image frame for the left eye, and the frame 412 to be a right image frame for the right eye. From such frames, the single frame 420 is generated, constituting part of image data in side-by-side space-division format.

In the frame 420, a left image 421 with halved horizontal resolution is arranged on the left half, while a right image 422 with a similarly halved horizontal resolution is arranged on the right half. If the input image data 10 is in side-by-side space-division format, then frames equivalent to the frame 420 are successively input.

Meanwhile, if the input image data 10 is in side-by-side space-division format, then the left image 421 and the right image 422 contained in the frame 420 are images that were obtained from different perspectives. Thus, although they are different images, it can be easily inferred that the two images will be extremely similar in practice.

Consequently, the determining unit 101 divides a frame contained in the input image data 10 (e.g., the frame 420) into left and right halves, and by measuring the similarity between the two partial images, determines whether or not the input image data 10 is in side-by-side space-division format.

The similarity between the two partial images 421 and 422 will be high in the case where the input image data 10 is in side-by-side space-division format, and low in the case of some other form of image data. Although it is possible to use an arbitrary method for measuring the similarity between the two partial images, the similarity might not be sufficiently determined if a method such as taking the sum of the absolute value of the per-pixel error between the two partial images is used, due to the effects of the parallax existing between the left and right images. An exemplary process for measuring the similarity between light and right images without being affected by parallax and enabling the determination of whether or not the input image data 10 is in side-by-side space-division format will now be described with reference to FIG. 16.

Figure 16:
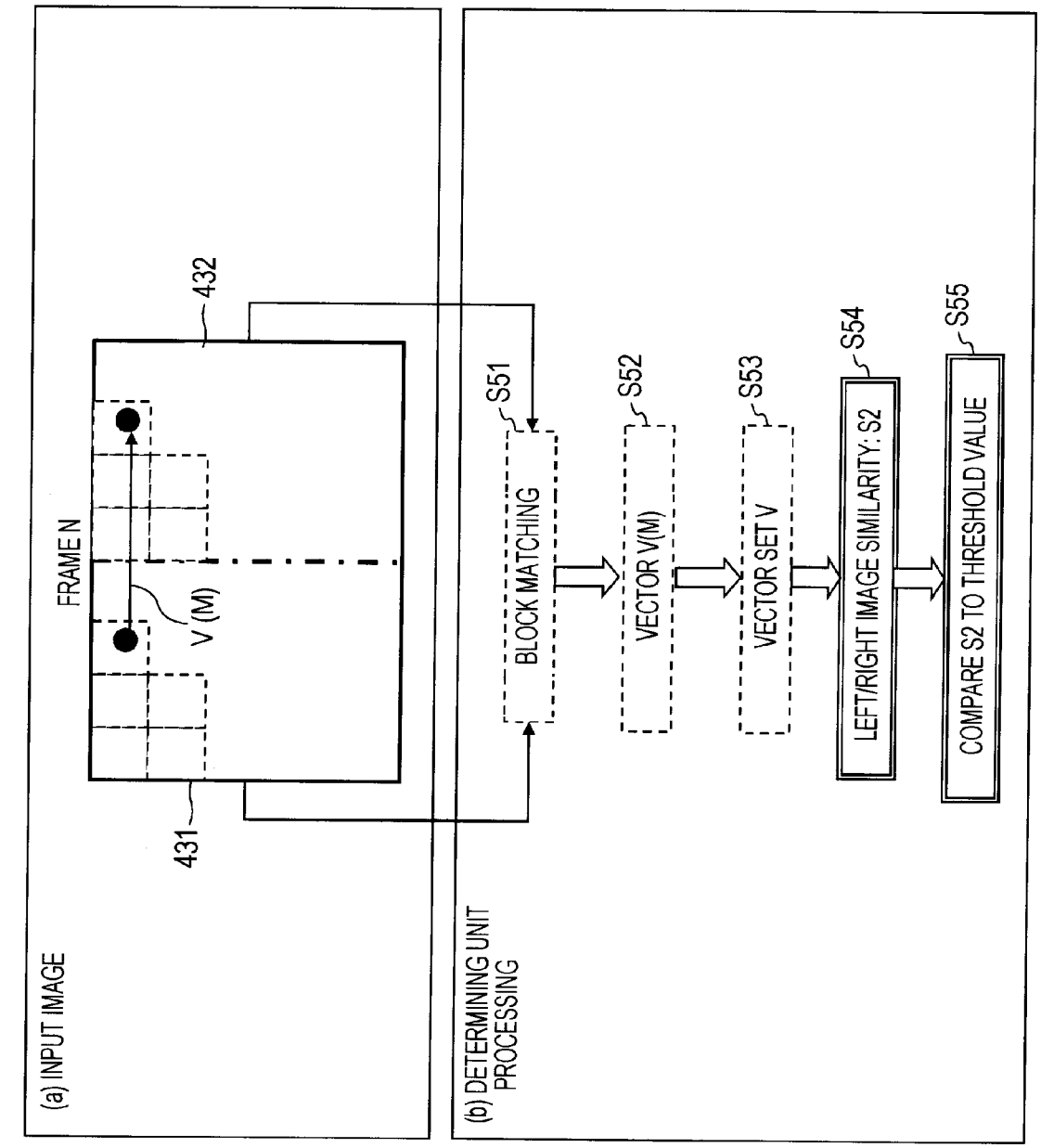
FIG. 16 is a diagram for explaining a process for determining whether or not input image data is in side-by-side space-division format.

The upper part of FIG. 16 illustrates the input image data 10, while the lower part of FIG. 16 illustrates processing executed by the determining unit 101.

The determining unit 101 first acquires a single frame N constituting part of the input image data 10, and then divides the image 431 in the frame N into blocks of arbitrary size. In step S51, the determining unit 101 searches the right image 432 for the portion that most closely resembles a respective block in the left image 431. A typical template matching technique such as block matching may be used for the above search.

Next, in step S52, a vector indicating the relative position from the respective block is used to express the position in the right image 432 that most closely resembles the block. The vector corresponding to the Mth block of the left image 431 is designated V(M). In the frame N shown in FIG. 16, an exemplary motion vector V(M) for a block M is shown. In step S53, the set V of motion vectors for a plurality of blocks is solved for.

Next, in step S54, the similarity S2 between the left and right partial images is computed according to the following equation.

$$S2 = -\sum_{M} |V_y(M)| \quad \text{(Eq. 2)}$$

In Eq. 2, $V_y(M)$ is the Y-direction component of a vector expressing the relative position in the right image that most closely resembles the Mth block. When capturing 3D images, the plural cameras are typically configured such that the optical axes are not misaligned in the vertical direction, and thus the positions of the similar portions in the left and right images are not likely to be misaligned in the vertical direction. In other words, the value of $V_y(M)$ becomes small for image data in side-by-side space-division format, and the value of S2 becomes large as a result.

In step S55, a threshold value T1, for example, is set in advance, and then compared to the similarity S2 between the left and right images that was computed using Eq. 2 on the basis of a motion vector V(M) obtained by block matching the left and right images in a single selected frame.

If (S2>T1) holds true, then the input image data is determined to be in side-by-side space-division format. If (S2>T1) does not hold true, then the input image data is determined to not be in side-by-side space-division format.

In the foregoing description, only one frame is used. However, it should be appreciated that the reliability of the determination results may be further increased by increasing the number of frames to be used, computing a plurality of similarity values, and then using the sum thereof as the final similarity value, for example. Furthermore, the above may be conducted without detecting vectors for all blocks.

(2-3-c) Method for Determining Interlaced Space-Division Format Image Data (Method 3)

As another example of the data determination processing executed by the determining unit 101, a method for determining whether or not input image data 10 is in interlaced space-division format (Method 3) will be described.

Figure 17:
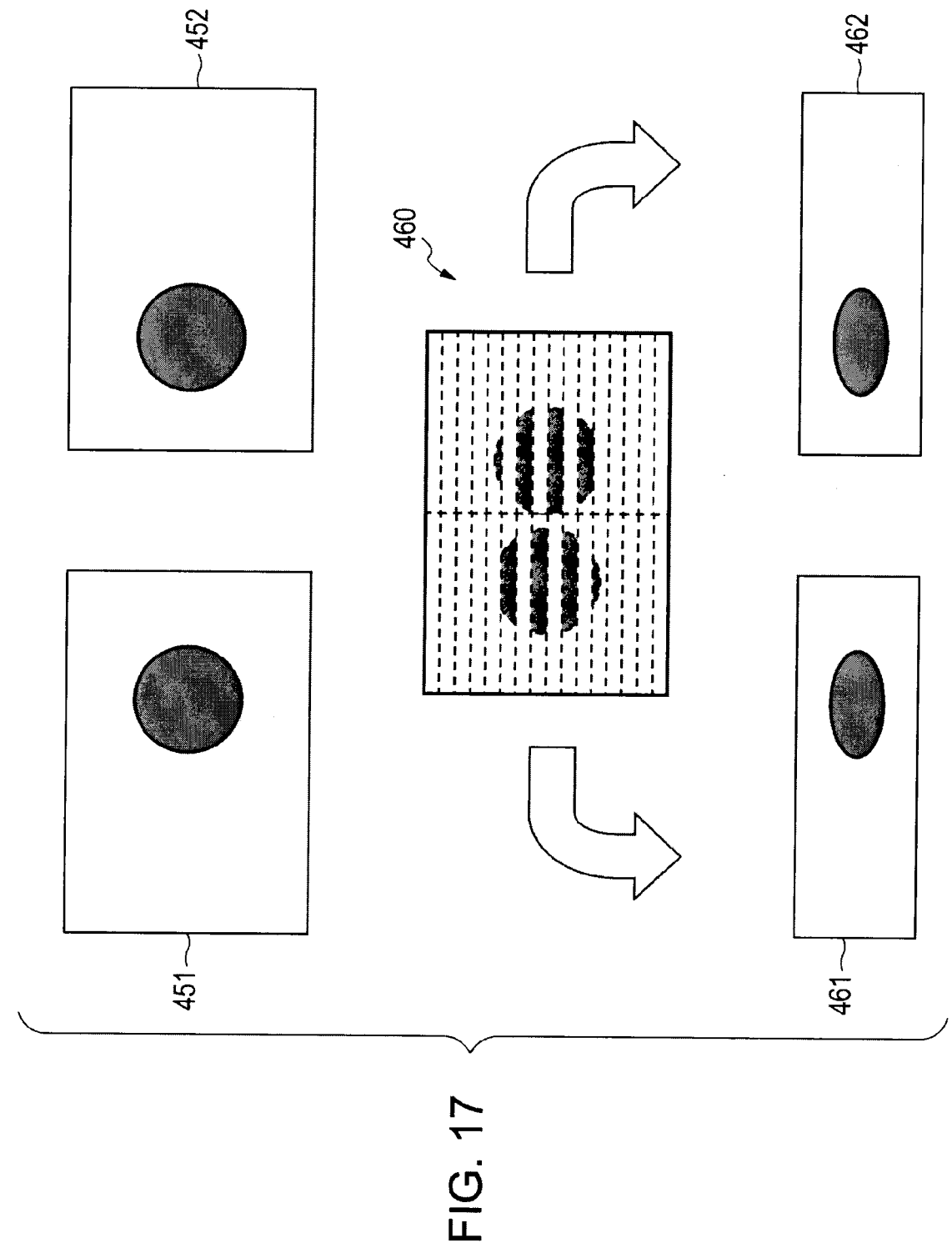
FIG. 17 is a diagram for explaining image data in interlaced space-division format.

In interlaced space-division format image data, each left image is arranged in the even fields of a single frame, while each right image is arranged in the odd fields. In FIG. 17, the frame 451 is a left image, the frame 452 is a right image, and the frame 460 is a single frame from image data in interlaced space-division format. If the input image data 10 is in interlaced space-division format, then frames equivalent to the frame 460 are successively input.

In the frame 460 constituting part of image data in interlaced space-division format, the left image 461 with halved vertical resolution is arranged in the even fields. The right 462 with similarly halved vertical resolution is arranged in the odd fields of the frame 460.

Meanwhile, the partial regions of the left and right images are highly similar, as previously described in (2-3-b) (the method for determining image data in side-by-side space-division format (Method 2)). However, due to the effects of parallax, few similar portions exist at the same positions in the left and right images. Consequently, when spatially comparing the same portions of the left and right images, the degree of similarity is likely to be low. At this point, consider 3D image data in a format other than the interlaced space-division format (i.e., image data in side-by-side space-division format or time-division format), as well as typical, non-3D images.

Figure 18:
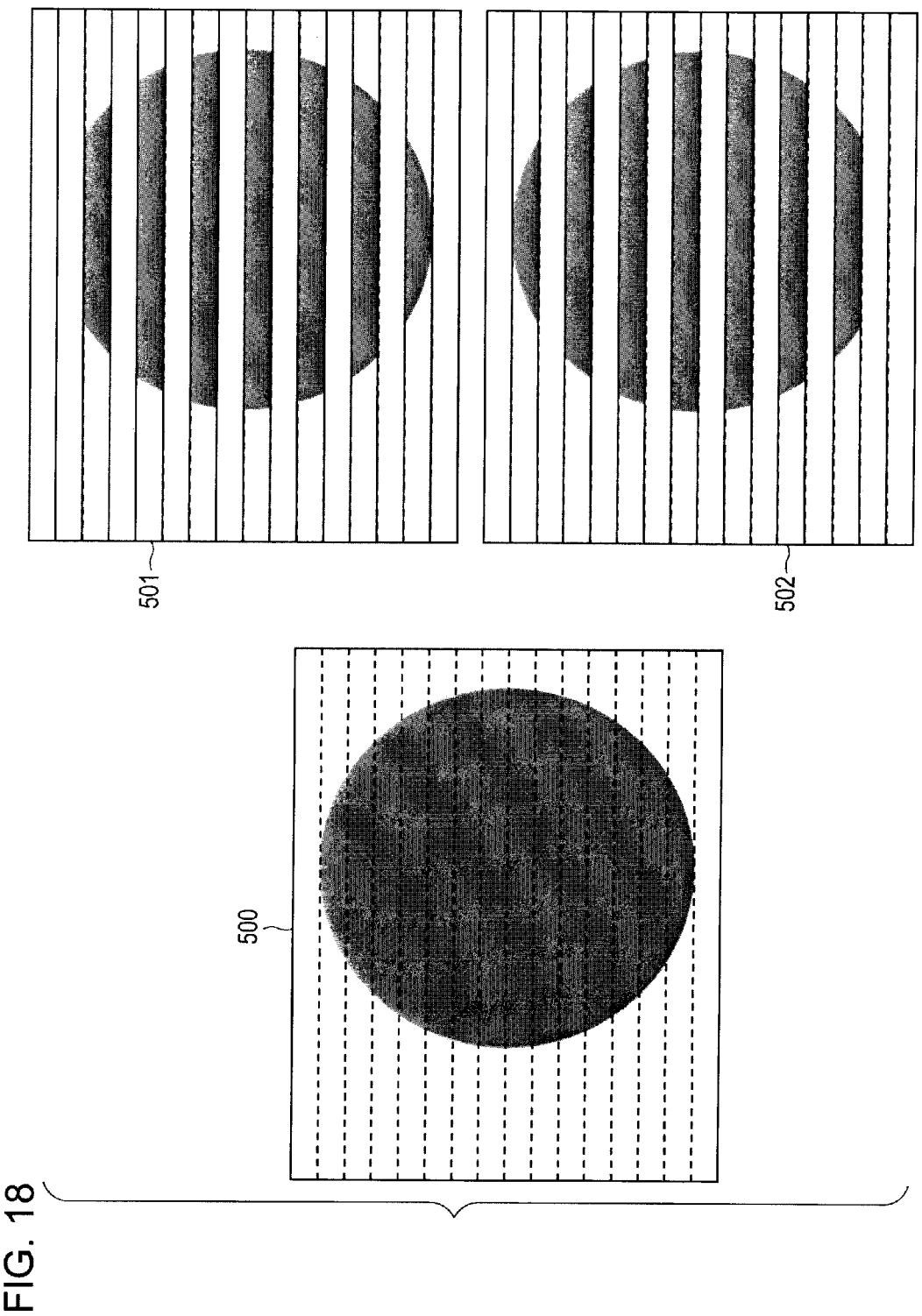
FIG. 18 is a diagram for explaining exemplary analysis of a frame of a typical image.

FIG. 18 illustrates a frame 500 from such typical image data, as well as the even field image 501 and the odd field image 502 thereof. FIG. 18 clearly demonstrates the similarity between the even field image 501 and the odd field image 502.

However, if the image data is in interlaced space-division format such as that shown by way of example in FIG. 17, then the similarity between the even field image (the left image 461) and the odd field image (the right image 462) is low. Utilizing such characteristics, it can be determined whether or not image data is in interlaced space-division format by the following method, for example.

An exemplary process for determining whether or not input image data 10 is in interlaced space-division format will now be described with reference to FIG. 19. The upper part of FIG. 19 illustrates input image data 10, while the lower part of FIG. 19 illustrates processing executed by the determining unit 101.

First, the determining unit 101 selects a single frame N (530, in this case) constituting part of the input image data 10. In step S71, the determining unit 101 divides the selected frame into even and odd fields, herein assumed to be the even field image 531 and the odd field image 532.

Next, in step S72, the determining unit 101 divides both the even field image 531 and the odd field image 532 into blocks of equal size, and measures the similarity between respective blocks at the same positions. The index used for the inter-block similarity may be, for example, the inverse of the sum of absolute per-pixel error. As this value increases, the similarity also increases.

In step S73, the aggregate similarity S3 obtained by summing the similarity values from each block is computed. As the value of S3 increases, the similarity also increases.

Finally, in step S74, a threshold value T2 is set in advance. If (S3<T2) holds true, then the image data is determined to be in interlaced space-division format.

In the case where a moving subject is captured in interlaced format, the position of the subject changes in the even and odd fields, resulting in low similarity and the possibility of an incorrect determination, even if the image data is not in interlaced space-division format. For this reason, the amount of motion corresponding to each block in the divided frame may be computed using other frames, for example. The determining unit 101 may then be configured to compute the similarity S3 using only blocks with sufficiently low amounts of motion. By configuring the determining unit 101 in this way, the likelihood of such incorrect determinations can be decreased.

The determining unit 101 of the image processing apparatus 100 shown in FIG. 1 executes determination processing that combines the three determination methods described above, for example. By means of such processing, the determining unit 101 determines whether the input image data 10 is in a. time-division format,
b. side-by-side space-division format, or
c. interlaced space-division format.

The determining unit 101 determines the input image data 10 to be in one of the above three 3D image display formats, and outputs the results to the converter 102.

It should be appreciated that the input data determination processing executed by the determining unit 101 may be configured such that a determination technique other than the determination methods described above is applied. For example, the input image data might be embedded with attribute data expressing the 3D image display format corresponding to that image data. In this case, the determining unit 101 may be configured to read the attribute data and determine the format of the input image data.

Alternatively, the user might input the 3D image display format of the input image data via an input unit for the image processing apparatus. In this case, the determining unit 101 may be configured to determine the image data format on the basis of the input information.

The 3D image display format information for the input image data thus determined by the determining unit 101 is input into the converter 102. When appropriate, the converter 102 converts the input image data to a format that can be displayed by the display unit 103 of the image processing apparatus 100.

(3) Details of Converter Processing

The converter 102 conducts format conversion when the input image data is in a format that is incompatible with the display format of the image processing apparatus 100. If such image data is output without being converted, then image data originally in space-division format might be displayed as data in time-division format, or vice versa, resulting in incorrect 3D display.

Before describing the processing executed by the converter 102 in detail, the problem of the perceived depth differing from the actual depth will be described. The above problem occurs when image data used for 3D display in space-division format is instead used for 3D display in time-division format, or conversely, when image data used for 3D display in time-division format is instead used for 3D display in space-division format.

In image data used for 3D display in space-division format, both a left image and a right image exist within each frame, as described earlier with reference to FIGS. 5 and 6. The left and right images within a single frame were captured simultaneously. When conducting display processing in accordance with the space-division format, similarly-structured frames N, N+1, and N+2 like those described with reference to FIGS. 5 and 6 are displayed in succession.

However, if such space-division format data containing both left and right images in each frame is processed for 3D display in time-division format, then the right images are displayed after displaying the left images, and thus the right images are perceived as delayed with respect to the left images.

If an image perceived with one eye is perceived with a delay by the other eye, depth is incorrectly perceived in an established optical illusion referred to as the Pulfrich effect. In the Pulfrich effect, a darkening filter such as sunglasses are used to limit the amount of light incident on one eye. Light incident on the other eye is left unchanged. In so doing, the image from the darkened eye is perceived later than the other eye, due to the reduced human sensitivity to dark light. When a pendulum swinging left to right is viewed in such a state, the pendulum appears to move on an elliptical path in the depth direction, even though the pendulum is actually just swinging from left to right with no variation in the depth direction.

If left and right images in space-division format are displayed in 3D in time-division format, the right images are perceived with a delay and thus can be interpreted as described earlier, thereby producing error in the perceived depth. In order to prevent depth perception error in time-division format 3D display, there should be no delay when perceiving images with the left and right eyes, and thus the display timings and capture timings for the left and right images should match. However, error in depth perception is easily conceivable when the left and right images of such image data are later displayed in space-division format.

In order to resolve such problems, the converter 102 of the image processing apparatus 100 in accordance with an embodiment of the present invention suitably converts the image data to enable the viewer to perceive the correct depth.

Hereinafter, the processing executed by the converter 102 of the image processing apparatus 100 will be described in detail. 3D image display format information regarding the input image data 10 from the determining unit 101 is input into the converter 102. On the basis of this input information, the converter 102 suitably converts the input image data 10 such that the correct depth is perceived when the image data is displayed on the display unit 103. The converted image data is output to the display unit 103.

However, if the results of the determination by the determining unit 101 indicate that the 3D image display format of the input image data 10 is compatible with the image processing apparatus, then the converter 102 does not convert the input image data 10.

Hereinafter, the data conversion processing executed in the converter 102 will be described in detail. The following two processing examples will be described in sequence.

(3-1) Exemplary process for converting space-division format input image data into time-division format data
(3-2) Exemplary process for converting time-division format input image data into space-division format data
(3-1) Exemplary process for converting space-division format input image data into time-division format data First, the data conversion processing executed by the converter 102 will be described for the case wherein the image output format of the image processing apparatus 100 is a time-division format and the input image data is in space-division format.

In this example, the image processing apparatus 100 is configured to display images according to the time-division format. When the input image data 10 is in space-division format, the converter 102 converts the input image data 10 by performing the following processing steps 1 to 4.

Step 1: Separate each frame in the input image data 10 into left and right images.

Step 2: Convert resolution of left and right images.

Step 3: Delay the time-direction phase of the right images (or the left images) by 0.5 frames.

Step 4: Reconstruct image data having left images in even frames and right images in odd frames.

The above steps will now be described. In image data in space-division format, each frame contains both a left image and a right image, as described earlier with reference to FIGS. 5 and 6. The left and right images may be side-by-side as shown in FIG. 5, or interlaced as shown in FIG. 6.

In step 1, the left and right images from each frame in the input image data 10 are separated. Information indicating the type of input image data in space-division format (i.e., side-by-side (FIG. 5) or interlaced (FIG. 6)) from the determining unit 101 is input into the converter 102, and the converter 102 separates the left and right images from each frame of the input image data 10 according to the input information.

For example, if the input image data 10 is in side-by-side space-division format as shown in FIG. 5, then the left and right images are assigned to the left and right halves of each frame, respectively. Thus, the left and right images are obtained by vertically dividing the image in each frame into halves.

If the input image data 10 is in interlaced space-division format, then the left and right images are assigned to the even and odd lines of each frame, respectively. Thus, the left images are obtained by extracting only the even lines and constructing a frame therefrom, while the right images are obtained by extracting only the odd lines and constructing a frame therefrom.

The left and right images obtained in step 1 are reduced in resolution compared to the original frame as a whole. For this reason, in step 2 the resolution of the left and right images is matched with the resolution of the original frame.

For example, if the input image data 10 is in side-by-side space-division format, then the horizontal resolution of the left and right images has been halved. In this case, the horizontal resolution of the left and right images is doubled.

If the input image data 10 is in interlaced space-division format, then the vertical resolution of the left and right images has been halved. In this case, the vertical resolution of the left and right images is doubled.

Various methods are applicable to the resolution conversion in step 2. For example, it is possible to use bilinear, bi-cubic, or similar methods.

In space-division format, both a left image and a right image are simultaneously presented in a single frame, and thus the left and right images belonging to the same frame are normally captured simultaneously as well. As described earlier, if such image data is used for 3D image display in time-division format, errors will occur in the depth perceived for moving objects.

Consequently, in step 3 the series of left images and the series of right images are shifted out of phase with each other by ½ frames in the time direction. For example, if the left images are displayed first in a time-division format 3D image display, then the relative, timewise phase of the right images is delayed by ½ frames with respect to the series of left images. If the right images are displayed first, then the relative, timewise phase of the left images is delayed by ½ frames with respect to the series of right images. The processing to modify the timewise phase of the series of images can be easily realized by means of frame interpolation, and established interpolation techniques can be applied thereto. For example, in many cases devices for conducting frame interpolation are already built into pre-existing apparatus such as LCD televisions, and thus such devices can be used as-is.

Figure 20:
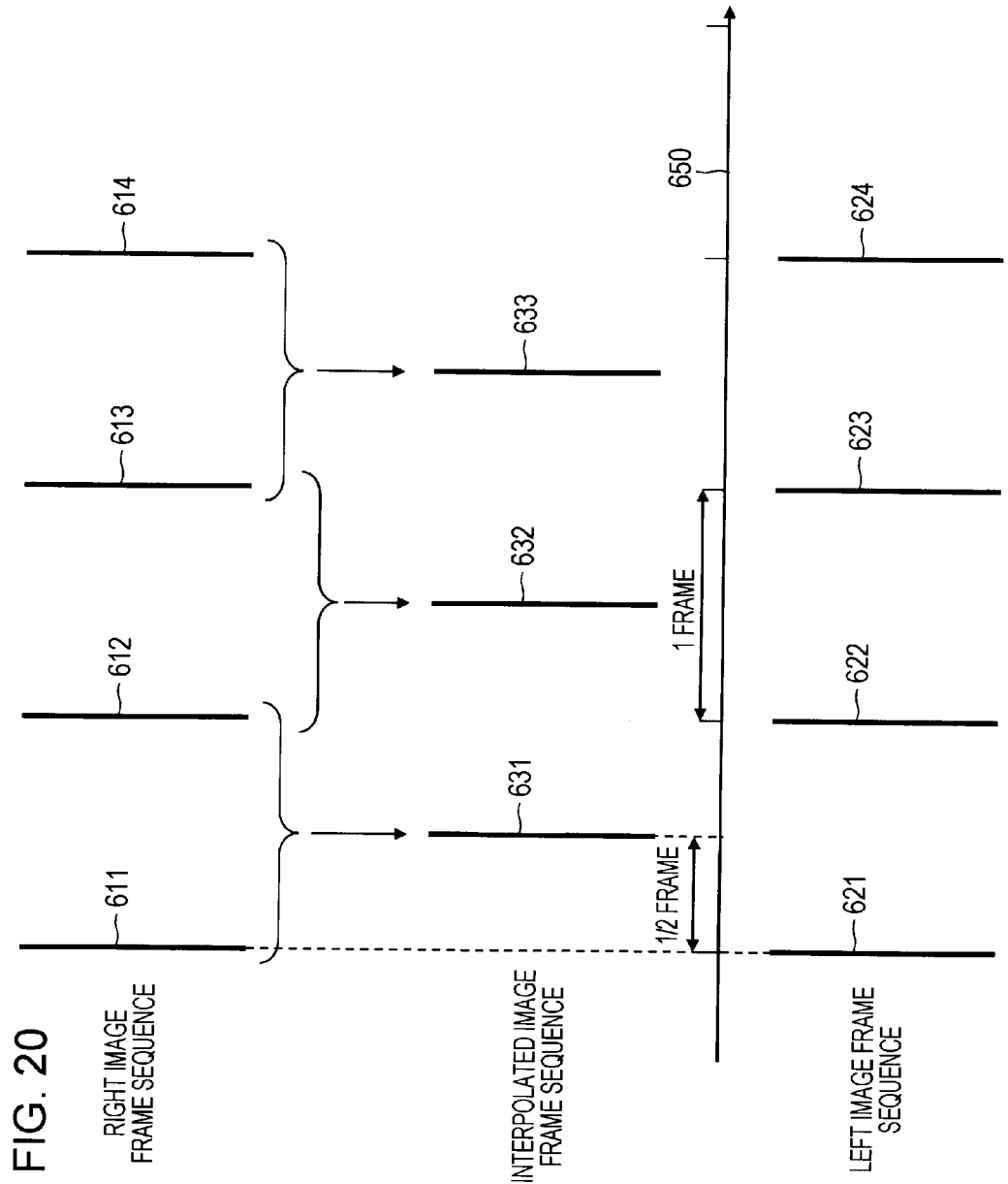
FIG. 20 is a diagram for explaining a process for using frame interpolation to delay the timewise phase of a series of right images with respect to a series of left images.

A process for using frame interpolation to delay the timewise phase of a series of right images with respect to a series of left images will now be described with reference to FIG. 20. The frames 611 to 614 shown in FIG. 20 represent a right image frame series obtained in the above steps 1 and 2. Likewise, the frames 621 to 624 represent a left image frame series also obtained in steps 1 and 2.

The right image frame series 611 to 614 and the left image frame series 621 to 624 are set at the same positions along the time axis 650. In other words, the series of left images and the series of right images are in-phase in the time direction.

The frames 631 to 633 represent an interpolated frame series obtained by frame interpolation of the series of right images. The interpolated image frame 631 is an interpolation of the right image frames 611 and 612. The interpolated image frame 632 is an interpolation of the right image frames 612 and 613. The interpolated image frame 633 is an interpolation of the right image frames 613 and 614.

The display times associated with each interpolated image are taken to be intermediate between the two originating images. Consequently, the interpolated image frame series 631 to 633, being a series solely made up of interpolated images, has a timewise phase delay of ½ frames with respect to the left image frame series 621 to 624.

In step 4, image data compatible with the time-division format is constructed by arranging the series of interpolated images in alternation with the series of left images. The processing conducted in step 4 will now be described with reference to FIG. 21.

Figure 21:
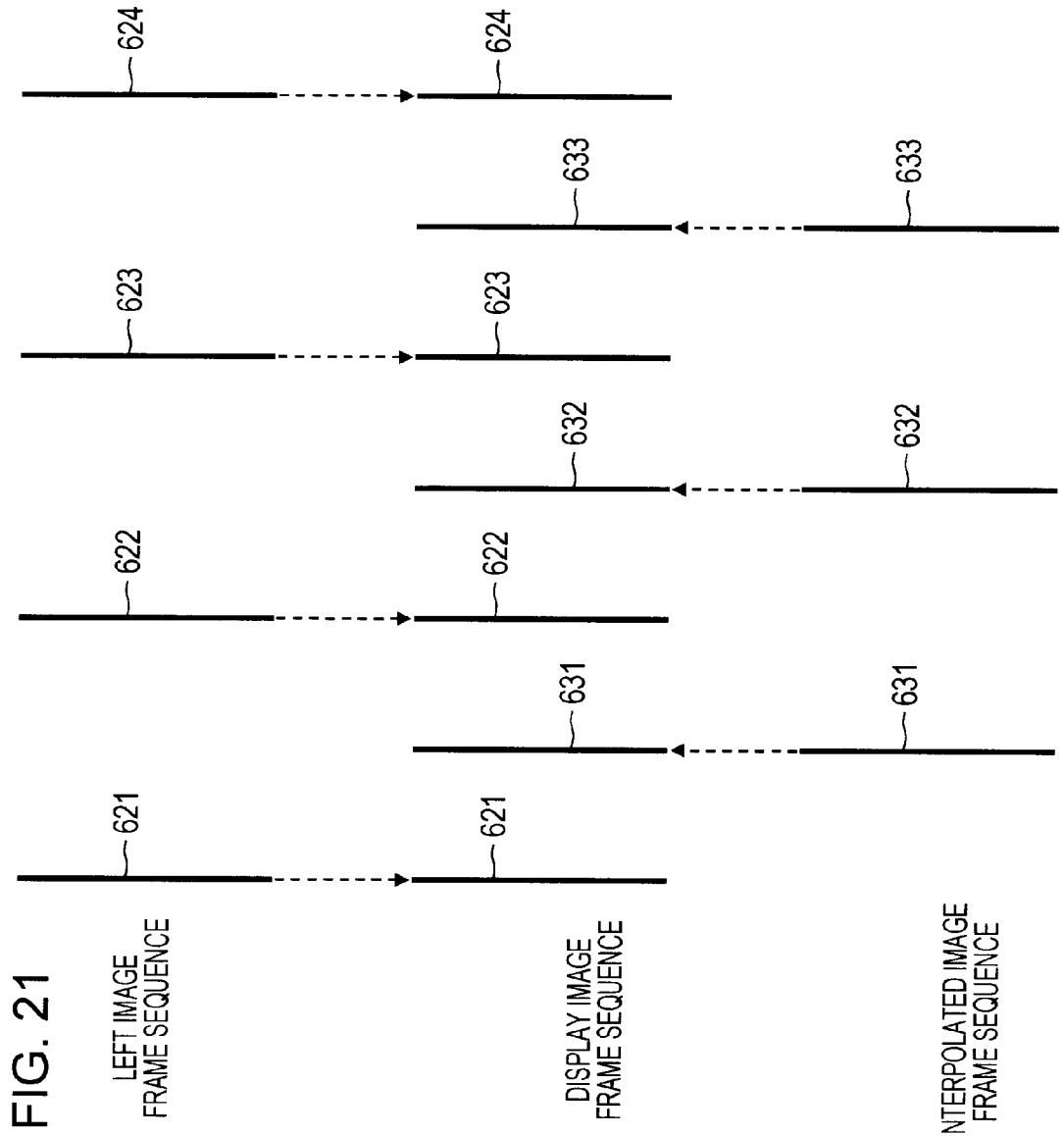
FIG. 21 is a diagram for explaining a process for constructing image data in time-division format by arranging a series of interpolated images in alternation with a series of left images.

FIG. 21 illustrates both the left image frame series to 624 and the interpolated image frame series 631 to generated on the basis of the right images, as described with reference to FIG. 20, as well as a display image frame series to which the above two image series have been applied.

The display image frame series is structured so as to display image frames from the left image frame series 621 to in alternation with the interpolated image frame series 631 to 633 generated on the basis of the right images. By displaying the display image frame series on the display unit 103, image data compatible with the time-division 3D image display format is output.

(3-2) Exemplary Process for Converting Time-Division Format Input Image Data into Space-Division Format Data Next, the data conversion processing executed by the converter 102 will be described for the case wherein the image output format of the image processing apparatus 100 is a space-division format and the input image data is in time-division format.

In this example, the image processing apparatus 100 is configured to display images according to the space-division format. When the input image data 10 is in time-division format, the converter 102 converts the input image data 10 by performing the following processing steps 1 to 4.

Step 1: Separate the input image data 10 into respective series of left and right images.

Step 2: Convert resolution of left and right images.

Step 3: Advance the time-direction phase of the right images (or the left images) by 0.5 frames.

Step 4: Generate single frames from left and right images, and reconstruct image data.

The above steps will now be described. In image data in time-division format, left images are contained in even frames, for example, while right images are contained in odd frames, as described earlier with reference to FIG. 4. For this reason, in step 1 the image data is separated into a series solely made up of the even frames, and a series solely made up of the odd frames.

A series of left images and a series of right images are obtained by means of the above processing. However, the resolution of the left and right images obtained in step 1 is too great to construct a single frame of image data in space-division format. Consequently, in step 2 the resolution of the left and right images is matched to half the resolution of a single frame of image data in a space-division format.

For example, if the display format of the image processing apparatus 100 is the side-by-side space-division format (see FIG. 5), then the horizontal resolution of the left and right images is halved. If the 3D image display format compatible with the 3D image display apparatus is the interlaced space-division format (see FIG. 6), then the vertical resolution of the left and right images is halved.

In the time-division format, the left and right images are displayed alternating each frame. For this reason, the left and right images are not normally captured simultaneously. As described earlier, if such image data is used for 3D image display in a space-division format, errors will occur in the depth perceived for moving objects.

Consequently, in step 3 the series of left images and the series of right images are made to be in-phase with each other in the time direction. For example, if the relative, timewise phase of the right images is delayed by ½ frames with respect to the series of left images, then the timewise phases of the series of left and right images are matched by advancing the timewise phase of the right images. The processing to modify the timewise phase of the series of images can be easily realized by means of frame interpolation, as described earlier.

Figure 22:
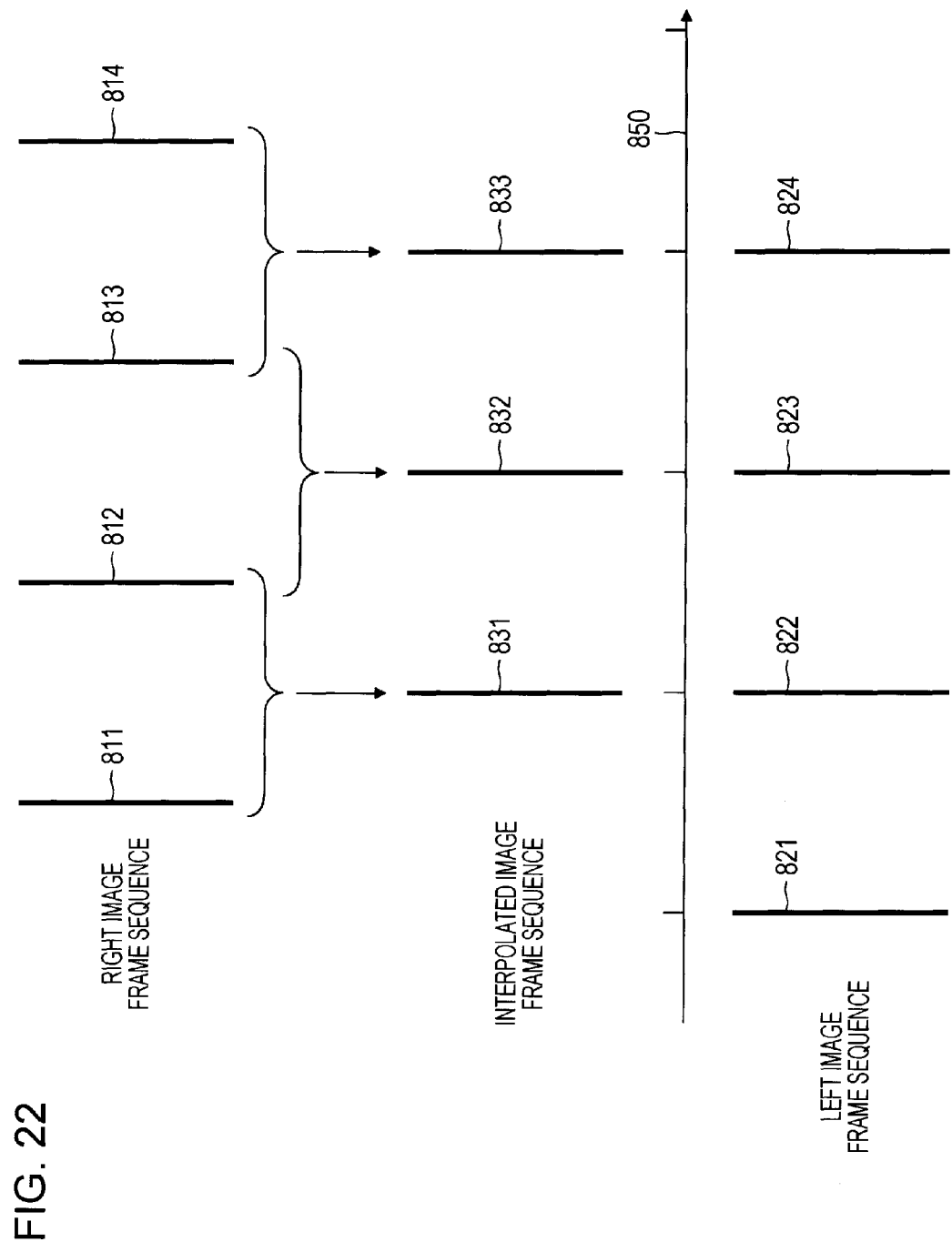
FIG. 22 is a diagram for explaining a process for using frame interpolation to advance the timewise phase of a series of right images with respect to a series of left images.

A process for using frame interpolation to advance the timewise phase of a series of right images with respect to a series of left images will now be described with reference to FIG. 22. The frames 811 to 814 shown in FIG. 22 represent a right image frame series obtained in the above steps 1 and 2. Likewise, the frames 821 to 824 represent a left image frame series also obtained in steps 1 and 2.

The right image frame series 811 to 814 and the left image frame series 821 to 824 are set at the same positions along the time axis 850. In other words, the series of right images is out-of-phase with the series of left images in the time direction, being delayed by ½ frames with respect to the series of left images.

The frames 831 to 833 represent an interpolated frame series obtained by frame interpolation of the series of right images. The interpolated image frame 831 is an interpolation of the right image frames 811 and 812. The interpolated image frame 832 is an interpolation of the right image frames 812 and 813. The interpolated image frame 833 is an interpolation of the right image frames 813 and 814.

The display times associated with each interpolated image are taken to be intermediate between the two originating images. Consequently, the interpolated image frame series 831 to 833 is in-phase with the left image frame series 821 to 824 in the time direction.

In step 4, image data compatible with a space-division format is constructed by generating respective frames from the series of interpolated images and the series of left images. This process is the same as the process for generating data described earlier in subsections 2-2-b and 2-2-c.

If the image processing apparatus 100 is configured to display image data in the side-by-side space-division format, then image frames compatible with image data in the side-by-side space-division format shown in FIG. 5 are generated from the series of interpolated images and the series of left images shown in FIG. 22. If the image processing apparatus 100 is configured to display image data in the interlaced space-division format, then image frames compatible with image data in the interlaced space-division format shown in FIG. 6 are generated from the series of interpolated images and the series of left images shown in FIG. 22. The generated image frames are then output to the display unit 103.

(4) Details of Display Unit Processing

The display unit 103 of the image processing apparatus 100 displays image data supplied from the converter 102 in either the time-division format or the space-division format. Typically, the display unit 103 is configured for only one display method.

In the image processing apparatus 100 in accordance with an embodiment of the present invention, image data that is incompatible with the display format of the display unit 103 is converted by converter 102 into data compliant with the display format. Consequently, the image data supplied by the converter 102 to the display unit 103 has been converted into image data compatible with the 3D image display format of the display unit 103, thereby enabling 3D display with correctly perceivable depth.

The foregoing thus describes the present invention with reference to a specific embodiment thereof. However, it should be obvious that persons skilled in the art may make modifications or substitutions without departing from the scope and spirit of the present invention. In other words, the foregoing discloses the present invention by way of example, and is not to be interpreted as being limiting. The scope of the present invention is to be determined in conjunction with the attached claims.

In addition, it is possible to execute the series of processes described in the present specification by means of hardware, software, or a compound configuration of both hardware and software. In the case of execution by means of software, a program stating a processing sequence may be installed and executed in the memory of a computer built into special-purpose hardware. Alternatively, the program may be installed and executed on a general-purpose computer capable of executing various processing. For example, the program may be recorded onto a recording medium in advance and then installed onto a computer. In addition, the program may be received via a network such as a LAN (Local Area Network) or the Internet, and then installed to a recording medium such as an internal hard disk.

It should also be appreciated that the various processes described in the present specification are not limited to being executed in a time series following that described herein, but may also be executed in parallel or individually, depending on the processing capability of the apparatus executing the process or other factors. In addition, in the present specification, a system refers to the logical assembly of a plurality of apparatus, and is not limited to respective apparatus being housed in a single physical unit.

The present application contains subject matter related to that disclosed in Japanese Priority Patent Application JP 2008-224289 filed in the Japan Patent Office on Sep. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
 a determining unit configured to receive image data for three-dimensional display as input, and determine the three-dimensional display format corresponding to the input data;
 a converter configured to convert the input data in accordance with the determination results from the determining unit; and
 a display unit configured to display the converted results from the converter;
 wherein the determining unit determines whether the input data is in time-division format or space-division format, and if the input data format differs from the display format corresponding to the display unit, then the converter converts the input data from the time-division format to the space-division format, or from the space-division format to the time-division format, and
 wherein if the input data is determined to be in space-division format, the determining unit determines whether the input data is in a side-by-side space-division format or an interlaced space-division format by selecting a single frame from the frames constituting the input data, computing the similarity of the left and right images in the selected frame by using a vector V(M) obtained by block matching of the left and right images, and comparing the computed similarity to a threshold value set in advance.

2. The image processing apparatus according to claim 1, wherein the determining unit selects two successive frames from the frames constituting the input data, analyzes the similarity of the two successive frames, and according to the analysis results, determines whether the input data is in time-division format or space-division format.

3. The image processing apparatus according to claim 1, wherein the determining unit selects a single base frame as well as two successive frames as reference frames from the frames constituting the input data, computes the similarity between two motion vectors V and W respectively computed from a combination of the base frame and one of the reference frames, compares the computed similarity to a threshold value set in advance, and according to the comparison results, determines whether the input data is in time-division format or space-division format.

4. The image processing apparatus according to claim 1, wherein the determining unit selects a single frame from the frames constituting the input data, generates an even field image and an odd field image from the selected frame, analyzes the similarity between the even field image and odd field image thus generated, and according to the analysis results, determines whether the input data is in a side-by-side space-division format or an interlaced space-division format.

5. The image processing apparatus according to claim 1, wherein the determining unit selects a single frame from the frames constituting the input data, generates an even field image and an odd field image from the selected frame, computes the inter-block similarity between the even field image and the odd field image thus generated, compares the computed similarity to a threshold value set in advance, and according to comparison results, determines whether the input data is in a side-by-side space-division format or an interlaced space-division format.

6. The image processing apparatus according to claim 1, wherein the converter is configured to convert data in space-division format to data in time-division format, such that, in each frame of the input data, the converter separates a left image for the left eye from a right image for the right eye, converts the resolution of the left image and the right image thus separated, delays the time-direction phase of the left image or the right image by 0.5 frames, and reconstructs output data with the left images as even frames and the right images as odd frames.

7. The image processing apparatus according to claim 1, wherein the converter is configured to convert data in time-division format to data in space-division format, such that, in each frame of the input data, the converter separates a left image for the left eye from a right image for the right eye, converts the resolution of the left image and the right image thus separated, advances the time-direction phase of the left image or the right image by 0.5 frames, and reconstructs output data by generating single frames from each left and right image.

8. An image processing method executed in an image processing apparatus, and comprising the steps of:
 receiving image data for three-dimensional display as input, and determining the three-dimensional display format corresponding to the input data;
 converting the input data in accordance with the determination results from the determining step; and
 displaying the converted results from the converting step;
 wherein the determining step comprises determining whether the input data is in time-division format or space-division format, and if the input data format differs from the display format corresponding to a display unit, then the converting step comprises converting the input data from the time-division format to the space-division format, or from the space-division format to the time-division format, and
 wherein if the input data is determined to be in space-division format, the determining step determines whether the input data is in a side-by-side space-division format or an interlaced space-division format by selecting a single frame from the frames constituting the input data, computing the similarity of the left and right images in the selected frame by using a vector V(M) obtained by block matching of the left and right images, and comparing the computed similarity to a threshold value set in advance.

9. A program, stored in a non-transitory computer-readable medium, the program causing an image processing apparatus to execute image processing comprising the steps of:
 receiving image data for three-dimensional display as input, and determining the three-dimensional display format corresponding to the input data;
 converting the input data in accordance with the determination results from the determining step; and
 displaying the converted results from the converting step;
 wherein the determining step comprises determining whether the input data is in time-division format or space-division format, and if the input data format differs from the display format corresponding to a display unit, then the converting step comprises converting the input data from the time-division format to the space-division format, or from the space-division format to the time-division format, and wherein if the input data is determined to be in space-division format, the determining step determines whether the input data is in a side-by-side space-division format or an interlaced space-division format by selecting a single frame from the frames constituting the input data, computing the similarity of the left and right images in the selected frame by using a vector V(M) obtained by block matching of the left and right images, and comparing the computed similarity to a threshold value set in advance.

* * * * *